US012737939B2

(12) United States Patent
Zhu

(10) Patent No.: US 12,737,939 B2
(45) Date of Patent: Sep. 15, 2026

(54) MAP OPTIMIZATION METHOD, ELECTRONIC DEVICE, AND STORAGE MEDIUM

(71) Applicant: Qfeeltech (Beijing) Co., Ltd., Beijing (CN)

(72) Inventor: Rui Zhu, Beijing (CN)

(73) Assignee: Qfeeltech (Beijing) Co., Ltd., Beijing (CN)

( * ) Notice: Subject to any disclaimer, the term of this patent is extended or adjusted under 35 U.S.C. 154(b) by 156 days.

(21) Appl. No.: 18/651,669

(22) Filed: Apr. 30, 2024

(65) Prior Publication Data

US 2024/0281001 A1 Aug. 22, 2024

Related U.S. Application Data

(63) Continuation of application No. PCT/CN2022/126588, filed on Oct. 21, 2022.

(30) Foreign Application Priority Data

Nov. 1, 2021 (CN) ......................... 202111282907.8

(51) Int. Cl.
*G01C 21/00* (2006.01)

(52) U.S. Cl.
CPC ....... *G01C 21/383* (2020.08); *G01C 21/3804* (2020.08); *G01C 21/3848* (2020.08); *G01C 21/3867* (2020.08)

(58) Field of Classification Search
CPC .............. G01C 21/383; G01C 21/3804; G01C 21/3848; G01C 21/3867
See application file for complete search history.

(56) References Cited

U.S. PATENT DOCUMENTS

| | | | | |
|---|---|---|---|---|
| 7,085,624 B2 * | 8/2006 | Aldred | G05D 1/0242 | 700/254 |
| 12,140,960 B2 * | 11/2024 | An | G06F 16/29 | |
| 2014/0088915 A1 * | 3/2014 | Vogel | G01C 15/00 | 702/150 |

(Continued)

FOREIGN PATENT DOCUMENTS

| | | |
|---|---|---|
| CN | 110244716 A | 9/2019 |
| CN | 111862133 A | 10/2020 |

(Continued)

OTHER PUBLICATIONS

International Search Report and Written Opinion dated Jan. 18, 2023, issued in PCT/CN2022/126588, filed on Oct. 21, 2022, and their English machine translations (19 pages).

(Continued)

*Primary Examiner* — Dale W Hilgendorf
(74) *Attorney, Agent, or Firm* — Alleman Hall LLP

(57) ABSTRACT

The present disclosure provides a map optimization method, an apparatus, an electronic device and a storage medium. Here, the map optimization method includes: obtaining an original map, the original map including an explore zone, a covered zone, an obstacle zone; determining and deleting an error zone from the explore zone in view of the covered zone and the obstacle zone. According to the technical solution of the present disclosure, in view of points in zones of different properties in the original map, and the localization principle, an error zone is determined and deleted from the original map, thereby realizing the optimization of the original map, such that the optimized map is closer to the actual map. This enables the autonomous mobile device to execute tasks more efficiently based on the optimized map.

8 Claims, 25 Drawing Sheets

(56) References Cited

U.S. PATENT DOCUMENTS

| | | | | |
|---|---|---|---|---|
| 2022/0044410 | A1* | 2/2022 | Wu | G06T 7/162 |
| 2022/0051032 | A1* | 2/2022 | Yan | G06V 20/588 |
| 2022/0074762 | A1* | 3/2022 | Artes | B25J 9/0003 |
| 2022/0334587 | A1 | 10/2022 | An et al. | |
| 2024/0078774 | A1* | 3/2024 | Park | G01C 21/005 |

FOREIGN PATENT DOCUMENTS

| | | | |
|---|---|---|---|
| CN | 112180931 | A | 1/2021 |
| CN | 112750180 | A | 5/2021 |
| CN | 112790669 | A | 5/2021 |
| CN | 113064413 | A | 7/2021 |
| CN | 113538671 | A | 10/2021 |
| KR | 20190023835 | A | 3/2019 |

OTHER PUBLICATIONS

Extended European Search Report issued on Sep. 12, 2025, in European Patent Application No. 228857991, filed on April 30, 2024 (7 pages).

J. Freiknecht and W. Effelsberg, "Procedural Generation of Multistory Buildings With Interior," IEEE Transactions on Games, vol. 12, No. 3, Sep. 2020 (14 pages).

Z. He, et al., "Furniture Free Mapping using 3D Lidars," Proceedings of the IEEE International Conference on Robotics and Biomimetics, Dali, China, Dec. 2019 (7 pages).

X. Zhao, et al., "Mapping with Reflection—Detection and Utilization of Reflection in 3D Lidar Scans," 2020 IEEE International Symposium on Safety, Security, and Rescue Robotics (SSRR), Nov. 4-6, Abu Dhabi, UAE (7 pages).

* cited by examiner

MAP OPTIMIZATION METHOD, ELECTRONIC DEVICE, AND STORAGE MEDIUM

CROSS REFERENCE TO RELATED APPLICATIONS

This application is a continuation of International Application No. PCT/CN2022/126588, filed on Oct. 21, 2022, which claims priority to Chinese patent application No. 202111282907.8, filed on Nov. 1, 2021, in Chinese Patent Office, and titled "MAP OPTIMIZATION METHOD, APPARATUS, ELECTRONIC DEVICE AND STORAGE MEDIUM." The contents of the above-referenced applications are incorporated by reference in their entirety in the present disclosure.

TECHNICAL FIELD

The present disclosure relates to data processing technologies, and in particular, to a map optimization method, an electronic device, and a storage medium.

BACKGROUND

With the advancement of technology and improvement of living standards, more and more autonomous mobile devices equipped with different functions have entered people's homes, such as cleaning robots, companion mobile robots, which have made people's life more comfortable and convenient.

An autonomous mobile device refers to a smart device configured to autonomously execute predetermined tasks within a predetermined work zone. Currently, autonomous mobile devices typically include, but are not limited to, cleaning robots (e.g., smart floor sweeping robots, smart floor mopping robots, window cleaning robots), companion mobile robots (e.g., smart electronic pets, nanny robots), service type mobile robots (e.g., reception robots at restaurants, hotels, meeting places), industrial inspection smart devices (e.g., electric power inspection robots, smart forklifts, etc.), security robots (e.g., home or commercial use bodyguard robots), etc.

An autonomous mobile device typically moves autonomously within a limited space. For example, a cleaning robot, a companion mobile robot typically moves in an indoor space. A service type mobile robot typically moves within a special limited space such as a hotel, a meeting place, etc. This limited space may be referred to as a work zone of the autonomous mobile device.

Oftentimes, a work zone of an autonomous mobile device is not an open space, but may be divided into different zones, such as multiple rooms, by walls, doors or other obstacles. As the autonomous mobile device moves in a target zone, it creates a map of the target zone. In subsequent operations, it may adjust a moving direction and route based on the created map.

In the process of the autonomous mobile device creating the map, due to influence of factors such as algorithm localization errors, level of accuracy of localization components, etc., localization data with errors may be generated, causing possible errors in the created map. For example, erroneous zones may appear, erroneous walls may appear, thicknesses of walls may not be consistent. When the autonomous mobile device adjusts the moving direction and route based on the created map, being affected by the errors in the map, it may make erroneous adjustments, thereby reducing the operation efficiency of the autonomous mobile device.

SUMMARY OF DISCLOSURE

The present disclosure provides a map optimization method, an electronic device and a storage medium, to solve the above technical problems.

In a first aspect, the present disclosure provides a map optimization method, including:

obtaining an original map, the original map including an explore zone, a covered zone, and an obstacle zone; and determining and deleting an error zone from the explore zone in view of the covered zone and the obstacle zone.

In some embodiments, the method also includes:

separating a wall zone from the obstacle zone, and optimizing the wall zone to obtain an optimized map.

In some embodiments, determining and deleting an error zone from the explore zone in view of the covered zone and the obstacle zone, includes:

extracting an outer profile of the explore zone, to obtain an explore zone profile line; extracting an outer profile of the covered zone, to obtain a covered zone profile line;

with regard to a plurality of key points on the covered zone profile line, expanding the covered zone outwardly based on these key points until the covered zone touches the obstacle zone and/or the explore zone profile line, to obtain an expanded covered zone;

with regard to a plurality of key points on the explore zone profile line, searching toward an inside of the explore zone based on these key points, to determine a first error zone, wherein the first error zone is located between the explore zone profile line and the obstacle zone, and has no overlap with the expanded covered zone; and deleting the first error zone from the explore zone, to obtain a first optimized map.

In some embodiments, the method also includes:

deleting a zone corresponding to the obstacle zone from an explore zone in the first optimized map to obtain a partitioned map, the partitioned map including a plurality of explore zone blocks;

determining a second error zone from the plurality of explore zone blocks, wherein the second error zone has no overlap with the covered zone, and has at least one edge that is not adjacent to the obstacle zone; and deleting the second error zone from the explore zone in the first optimized map to obtain a second optimized map.

In some embodiments, the obstacle zone also includes an ordinary obstacle zone;

wherein optimizing the wall zone includes:

performing a dilation operation or a profile filling operation on a location corresponding to the ordinary obstacle zone in the second optimized map, to fill a cavity in the second optimized zone, and performing a smooth operation on an edge of an explore zone in the second optimized map, to obtain a third optimized map;

extracting an outer profile of an explore zone in the third optimized map to obtain a new explore zone profile line;

with regard to the new explore zone profile line, performing a straightening operation on an edge of the new explore zone profile line within a margin of error, to obtain a new outer wall zone profile line; and with regard to a plurality of key points on the new outer wall zone profile line, searching toward an inside of the third optimized map based on these key points, to obtain a new wall zone profile line.

In some embodiments, optimizing the wall zone also includes:

expanding, based on the new outer wall zone profile line, the explore zone in the third optimized map to the new outer wall zone profile line, to obtain an optimized explore zone, and to obtain an optimized map.

In some embodiments, expanding, based on the new outer wall zone profile line, the explore zone in the third optimized map to the new outer wall zone profile line, to obtain the optimized explore zone, includes:

with regard to a plurality of key points on the new outer wall zone profile line, searching in a predetermined direction toward an inside of the third optimized map based on these key points, and labelling non-explore zone points found in the search as new explore zone points, until points in the explore zone of the third optimized map are found, wherein the new explore zone points and the points in the explore zone of the third optimized map form an optimized explore zone.

In a second aspect, the present disclosure provides a map optimization apparatus, including:

an original map obtaining device configured to obtain an original map, wherein the original map includes an explore zone, a covered zone, and an obstacle zone;

an error zone deleting device configured to determine and delete an error zone from the explore zone in view of the covered zone and the obstacle zone.

In some embodiments, the apparatus also includes:

a wall optimization device configured to separate a wall zone from the obstacle zone, and to optimize the wall zone, to obtain an optimized map.

In some embodiments, the error zone deleting device is specifically configured to:

extract an outer profile of the explore zone, to obtain an explore zone profile line;

extract an outer profile of the covered zone, to obtain a covered zone profile line;

extract an outer profile of the covered zone, to obtain a covered zone profile line;

with regard to a plurality of key points on the explore zone profile line, search toward an inside of the explore zone based on these key points, to determine a first error zone, wherein the first error zone is located between the explore zone profile line and the obstacle zone, and has no overlap with the expanded covered zone;

delete the first error zone in the explore zone to obtain a first optimized map.

In some embodiments, the error zone deleting device is also configured to:

delete a zone corresponding to the obstacle zone from an explore zone in the first optimized map, to obtain a partitioned map, the partitioned map including a plurality of explore zone blocks;

determine a second error zone from the plurality of explore zone blocks, wherein the second error zone has no overlap with the covered zone, and has at least one edge that is not adjacent to the obstacle zone;

delete the second error zone from the explore zone in the first optimized map to obtain a second optimized map.

In some embodiments, the obstacle zone also includes an ordinary obstacle zone.

The wall optimization device is specifically configured to:

perform a dilation operation or a profile filling operation on a location corresponding to the ordinary obstacle zone in the second optimized map, to fill a cavity in the second optimized zone, and perform a smooth operation on an edge of an explore zone in the second optimized map, to obtain a third optimized map;

extract an outer profile of an explore zone in the third optimized map to obtain a new explore zone profile line;

with regard to the new explore zone profile line, perform a straightening operation on an edge of the new explore zone profile line within a margin of error, to obtain a new outer wall zone profile line;

with regard to a plurality of key points on the new outer wall zone profile line, search toward an inside of the third optimized map based on the key points, to obtain a new wall zone profile line.

In some embodiments, the wall optimization device is also specifically configured to:

expand, based on the new outer wall zone profile line, the explore zone in the third optimized map to the new outer wall zone profile line, to obtain an optimized explore zone, and to obtain an optimized map.

In some embodiments, when the wall optimization device is configured to expand, based on the new outer wall zone profile line, the explore zone in the third optimized map to the new outer wall zone profile line, to obtain the optimized explore zone, the wall optimization device is specifically configured to:

with regard to a plurality of key points on the new outer wall zone profile line, search in a predetermined direction toward an inside of the third optimized map based on the key points, and label non-explore zone points found in the search as new explore zone points, until points in the explore zone of the third optimized map are found, wherein the new explore zone points and the points in the explore zone of the third optimized map form an optimized explore zone.

In a third aspect, the present disclosure provides an electronic device, including: a storage device configured to store program instructions; and a processor configured to retrieve and execute the program instructions from the storage device, to perform the method according to the first aspect.

In a fourth aspect, the present disclosure provides a computer-readable storage medium. The storage medium stores a computer program. When the computer program is executed by the processor, the method according to the first aspect is performed.

In a fifth aspect, the present disclosure provides a program product, including a computer program. When the computer program is executed by the processor, the method according to the first aspect is performed.

The present disclosure provides a map optimization method, an apparatus, an electronic device and a storage medium. The map optimization method includes: obtaining an original map, the original map including an explore zone, a covered zone, and an obstacle zone; and determining and deleting an error zone from the explore zone in view of the covered zone and the obstacle zone. According to the technical solution of the present disclosure, in view of points in zones of different properties in the original map, and the localization principle, an error zone is determined and deleted from the original map, thereby realizing the optimization of the original map, such that the optimized map is closer to the actual map. This enables the autonomous mobile device to execute tasks more efficiently based on the optimized map.

BRIEF DESCRIPTIONS OF THE DRAWINGS

To explain more clearly the technical solutions of the present disclosure or of the existing technologies, the accompanying drawings that are used in the description of the embodiments or the existing technologies are briefly introduced. Obviously, the accompanying drawings described below show some embodiments of the present disclosure. For a person having ordinary skills in the art, other accompanying drawings may be obtained based on these accompanying drawings without expending creative effort.

Figures 3A, 3B:
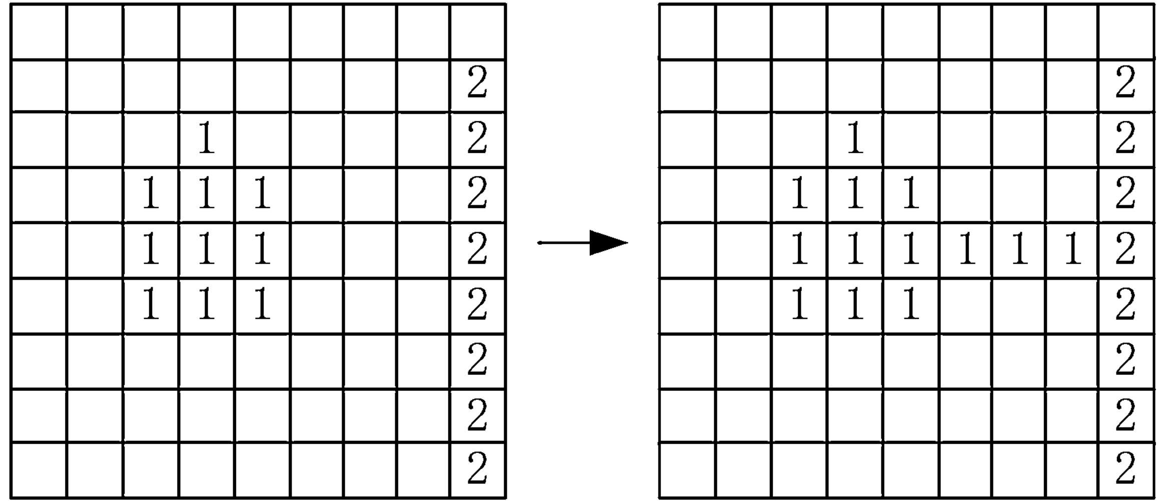
Figure 4A:
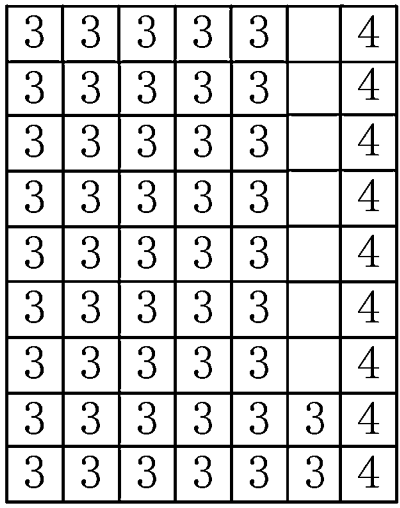
Figure 4B:
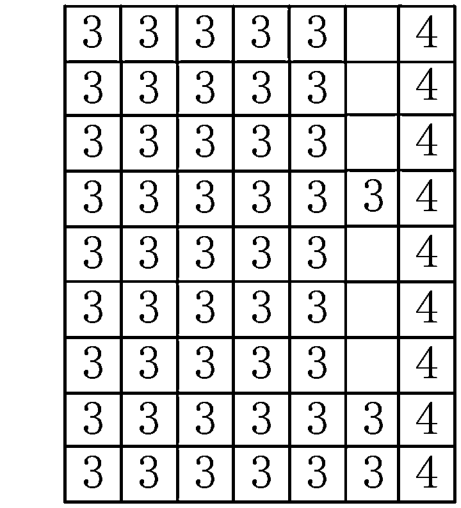
Figure 5A:
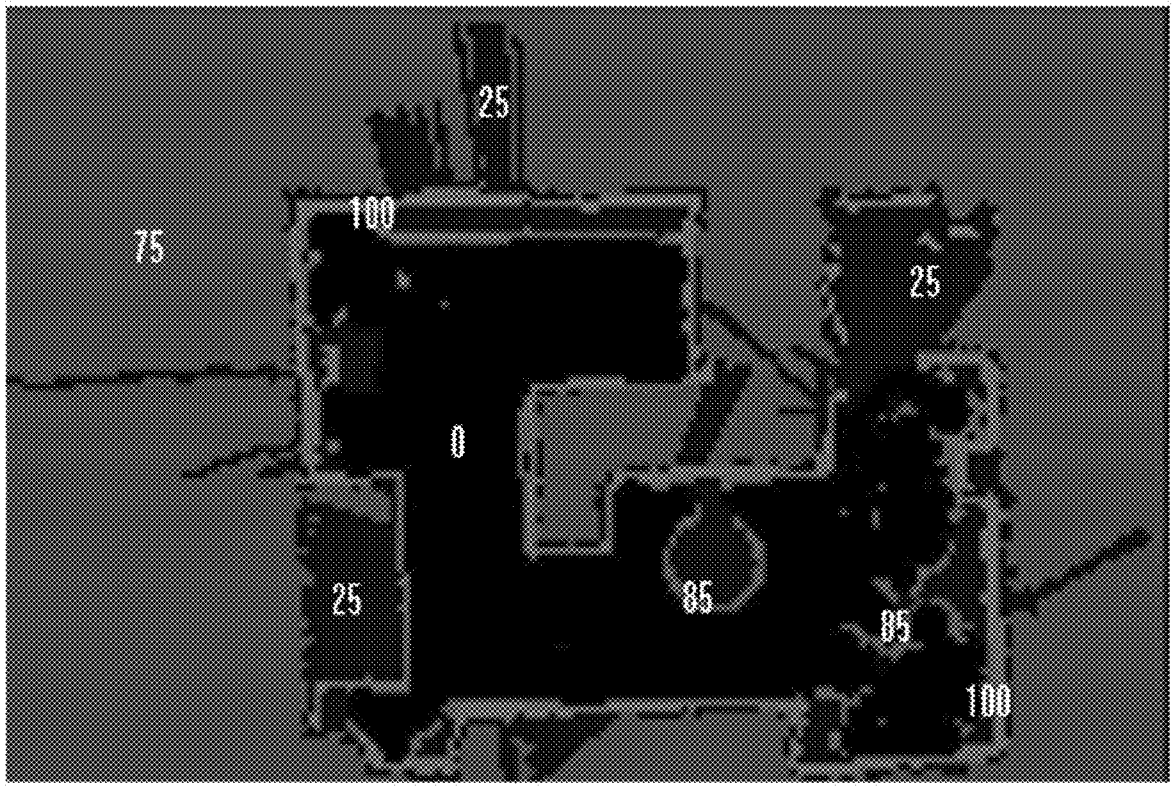
Figure 5B:
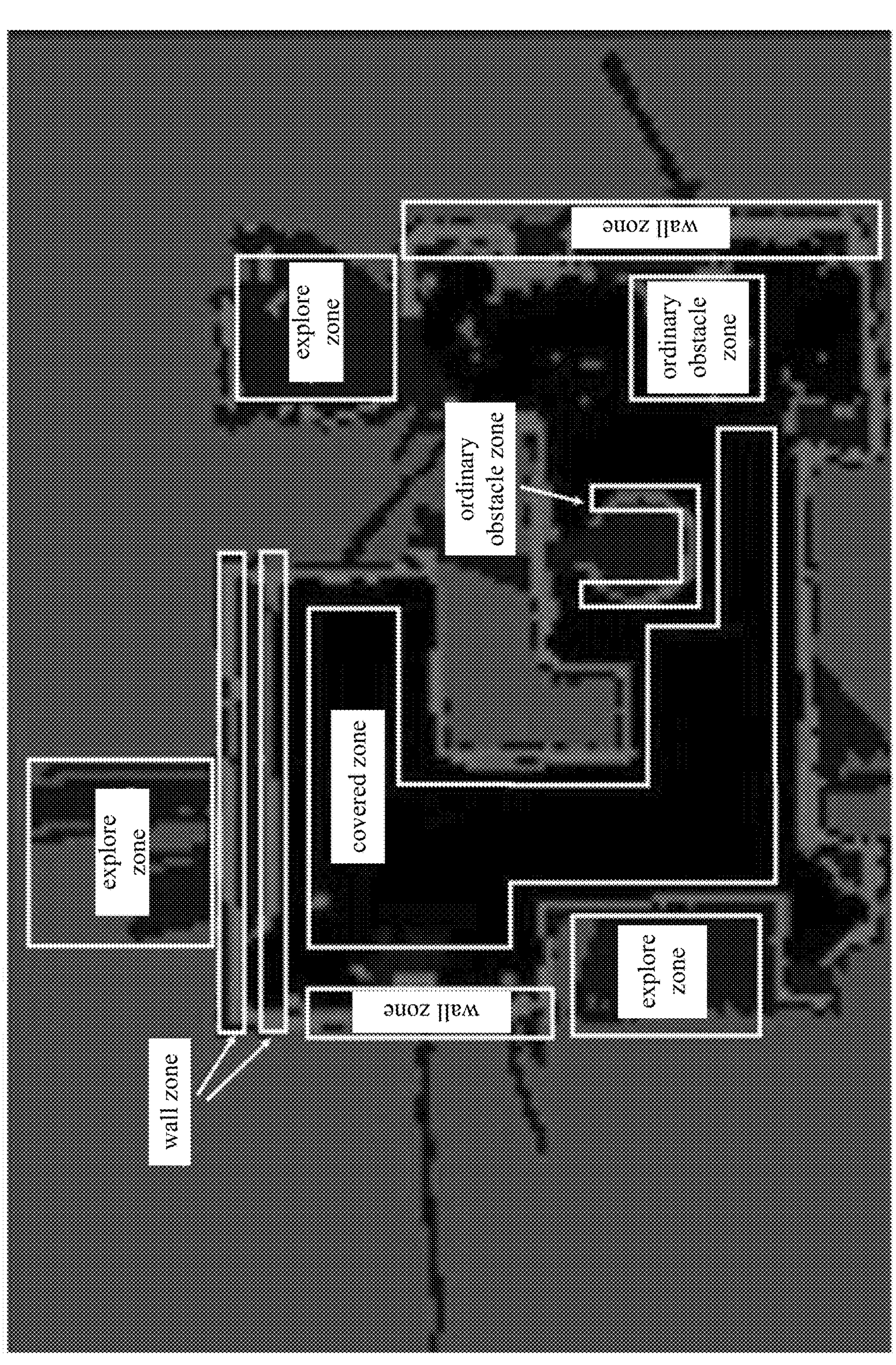
Figure 5C:
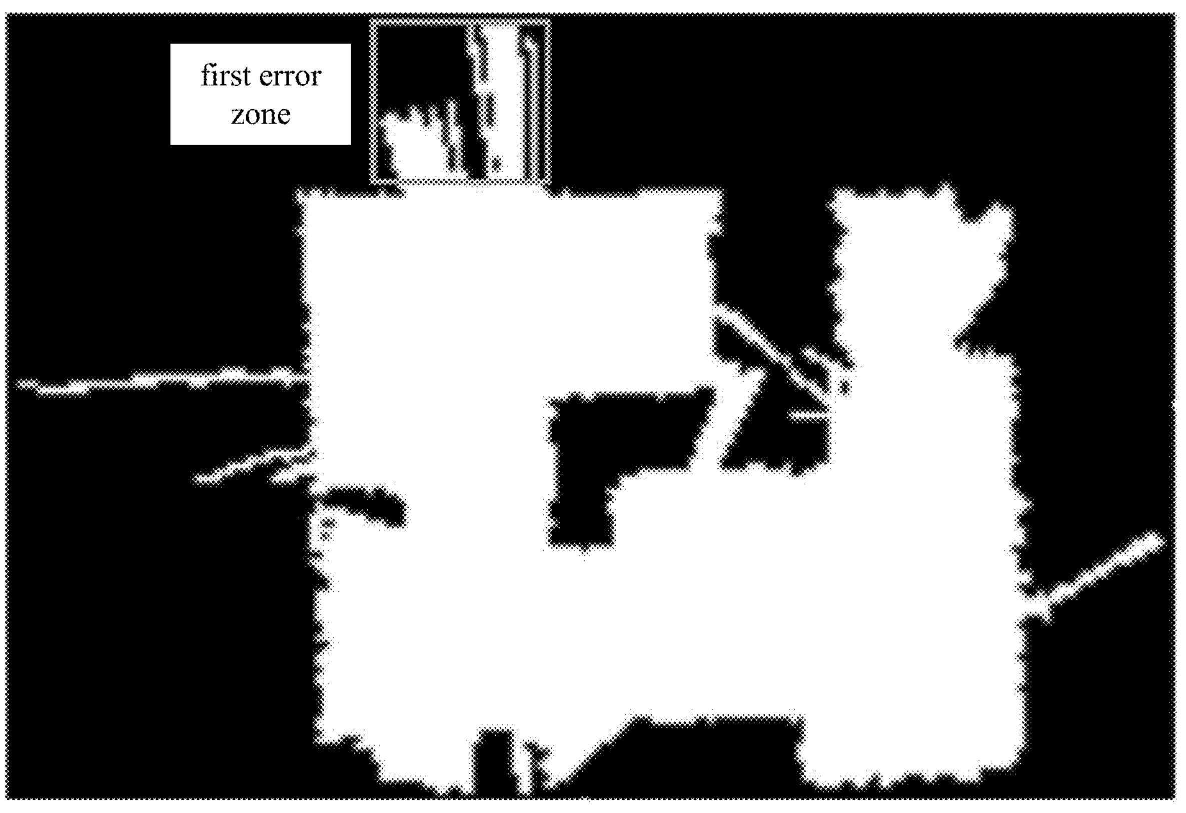
Figure 5D:
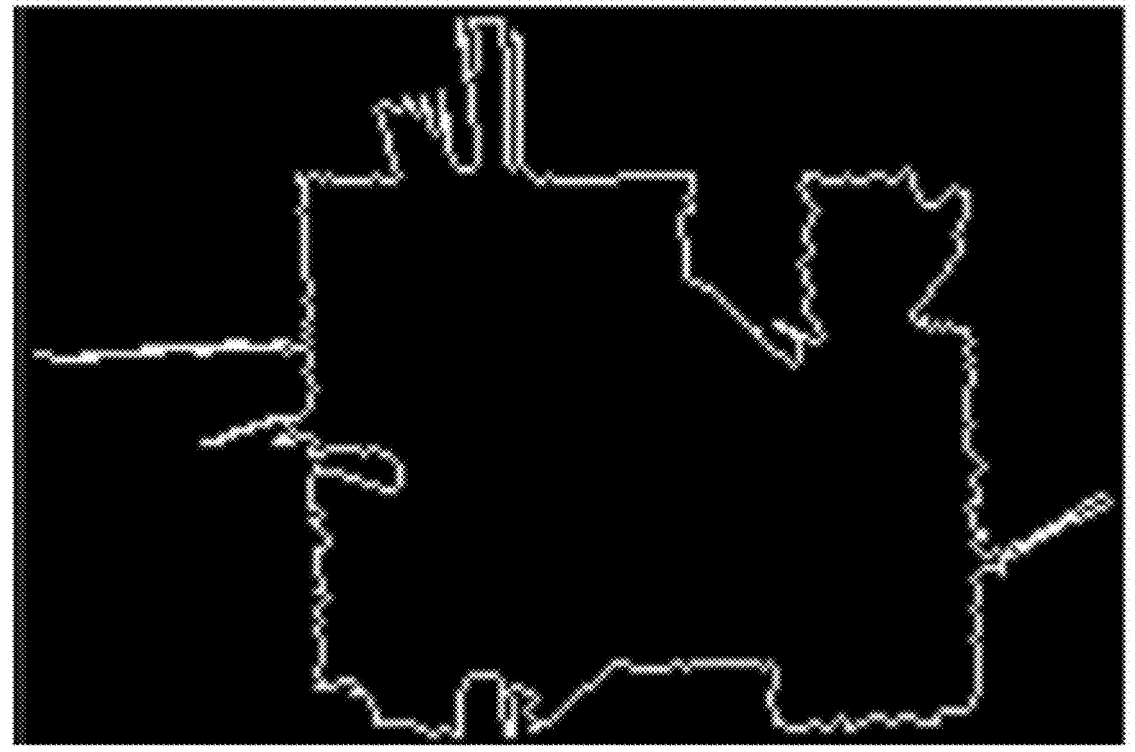
Figure 5E:
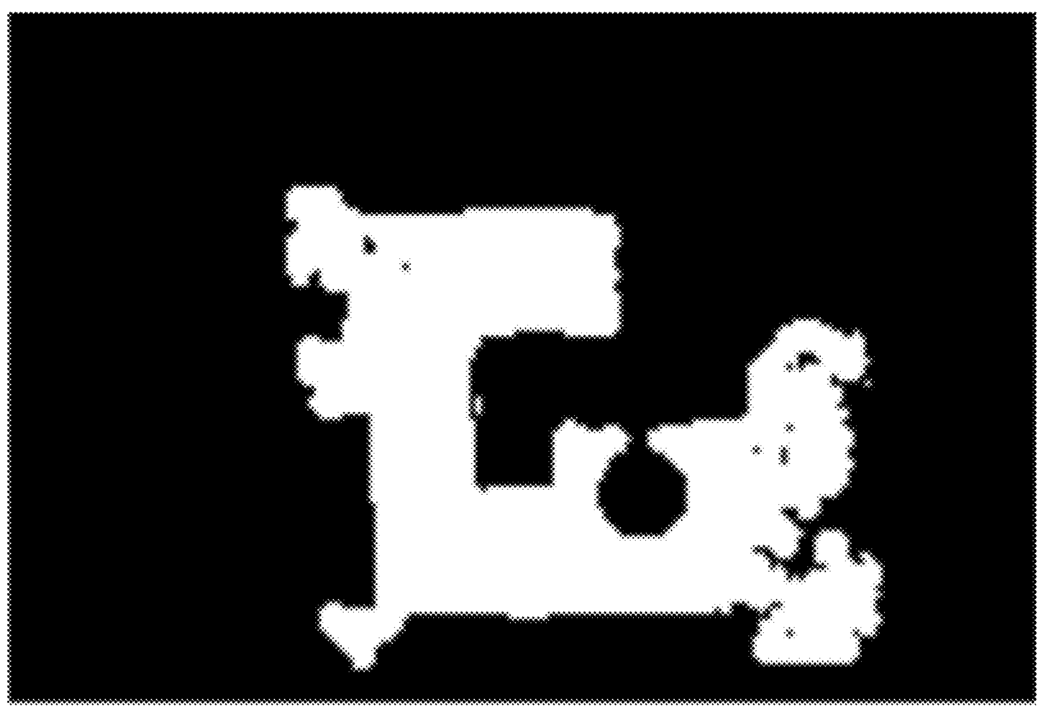
Figure 5F:
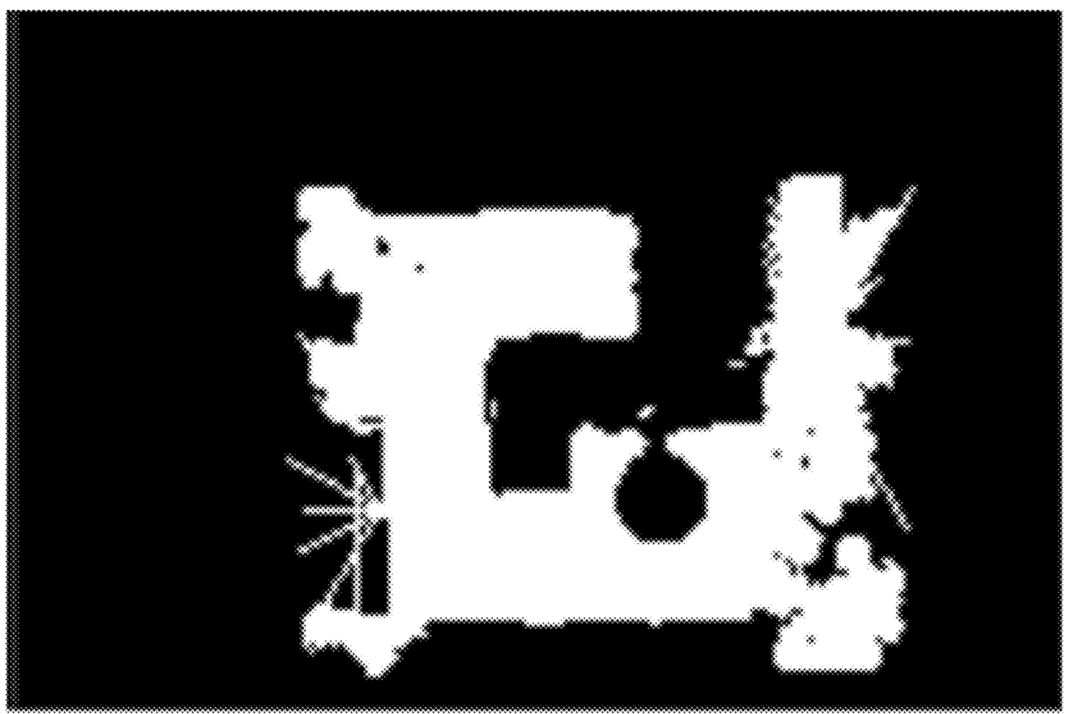
Figure 5G:
Figure 5H:
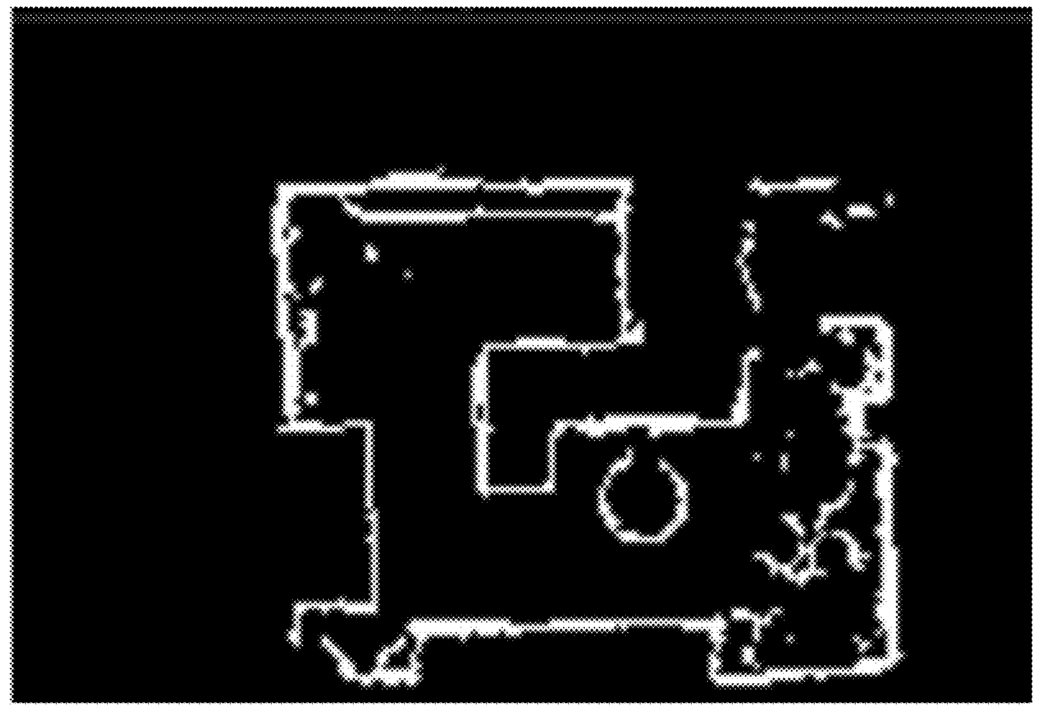
Figure 5I:
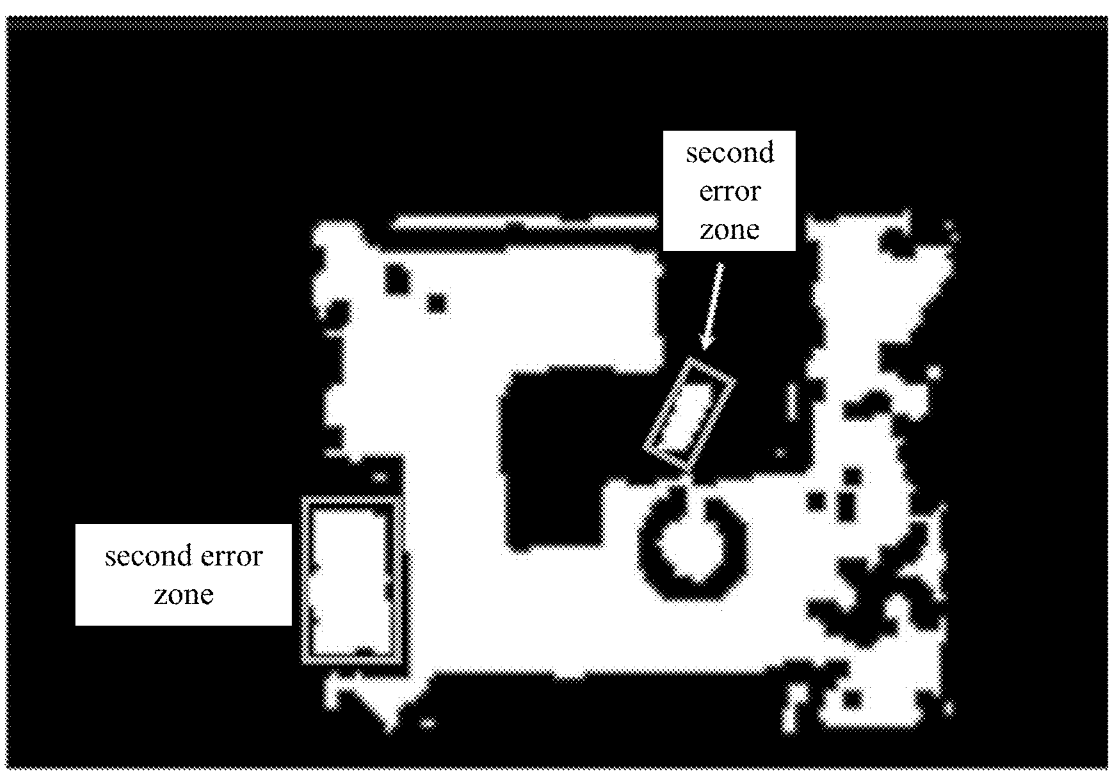
Figure 5J:
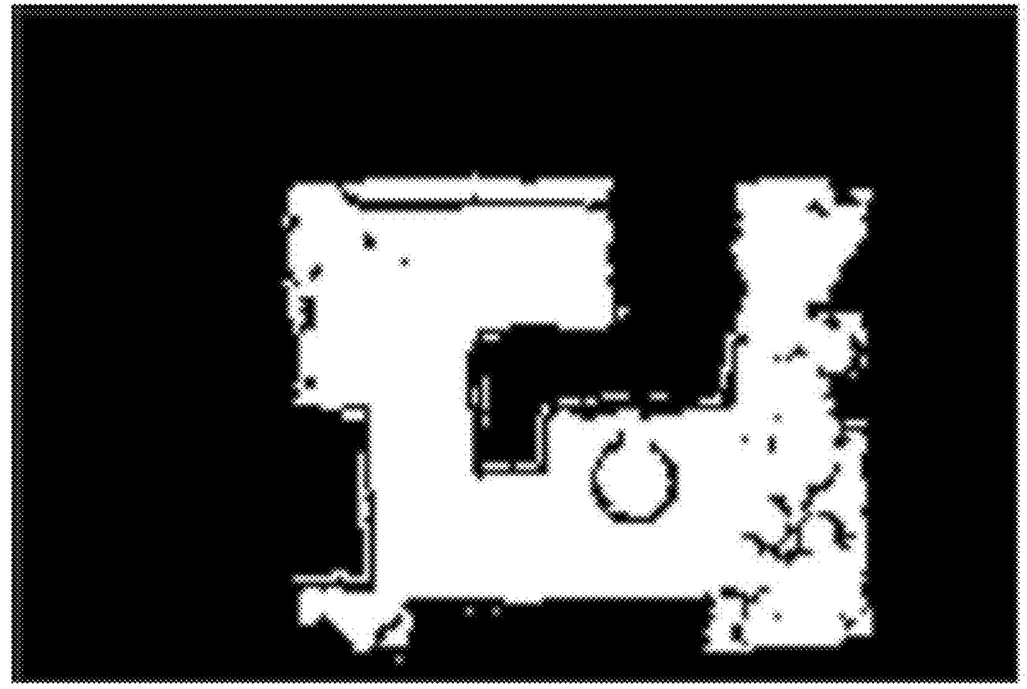
Figure 5K:
Figure 5L:
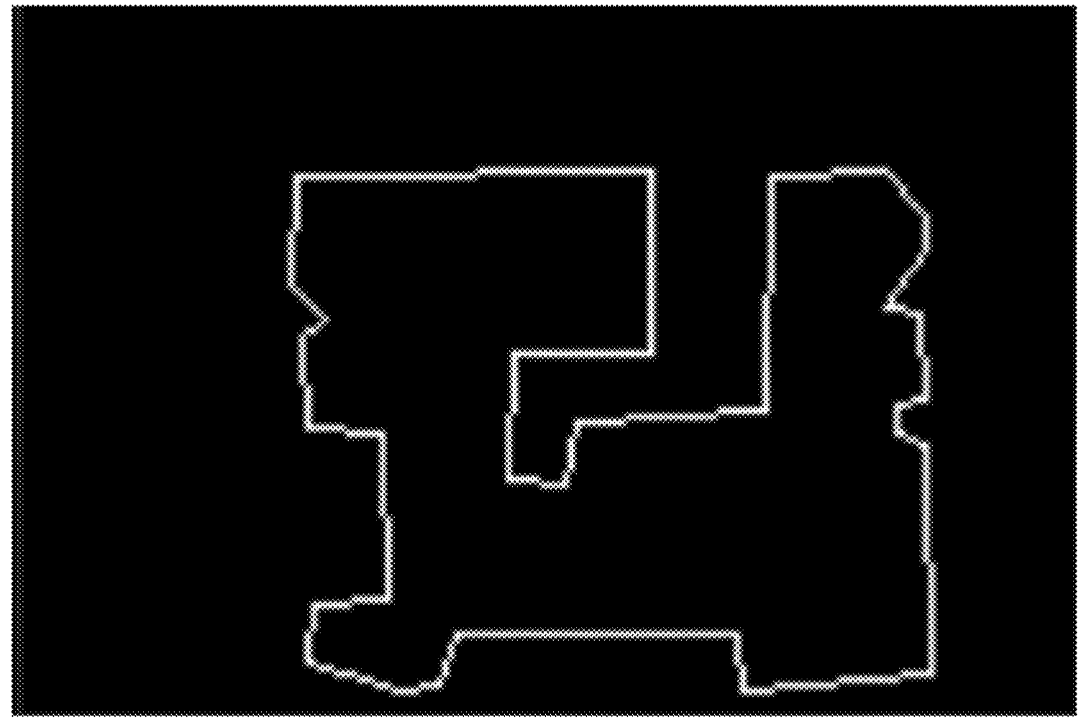
Figure 5M:
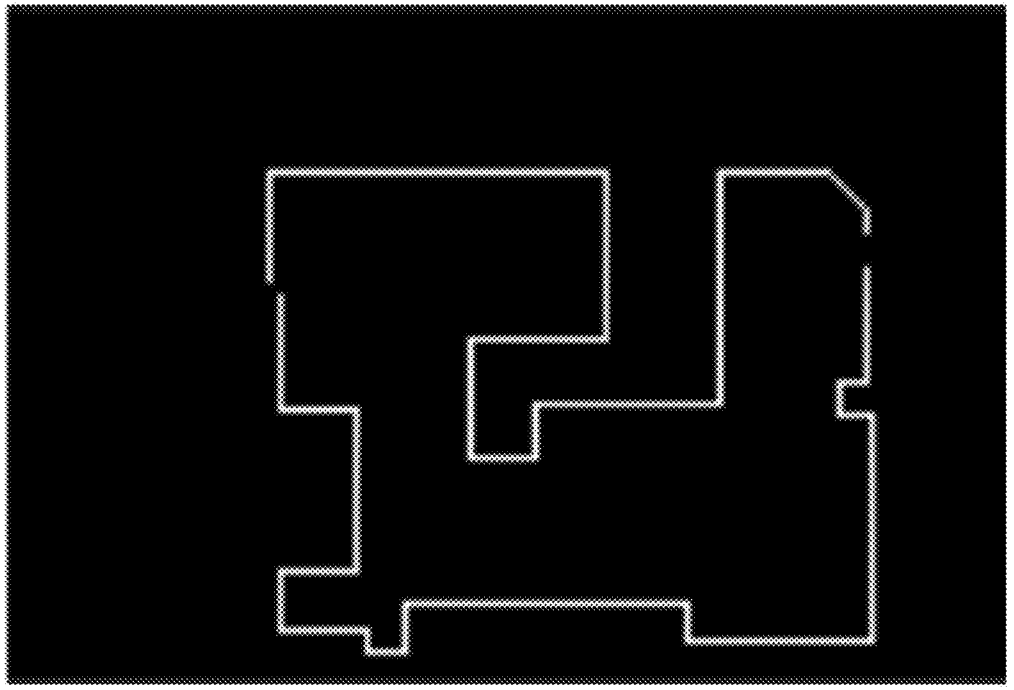
Figure 5N:
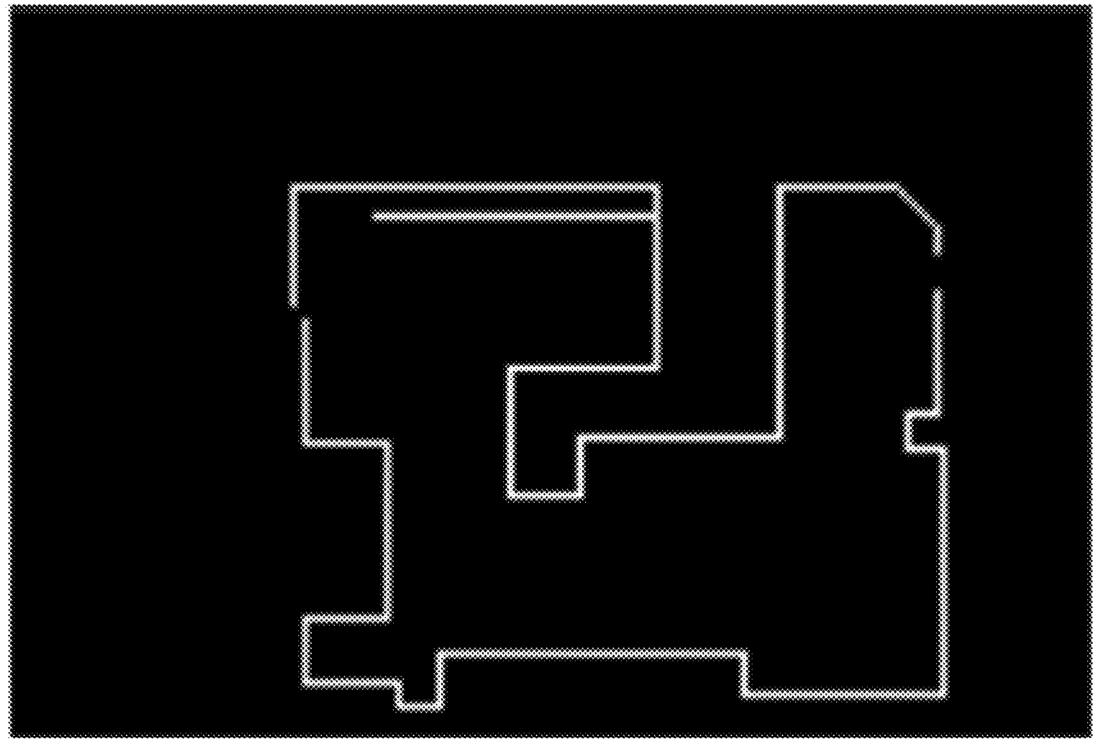
Figure 5O:
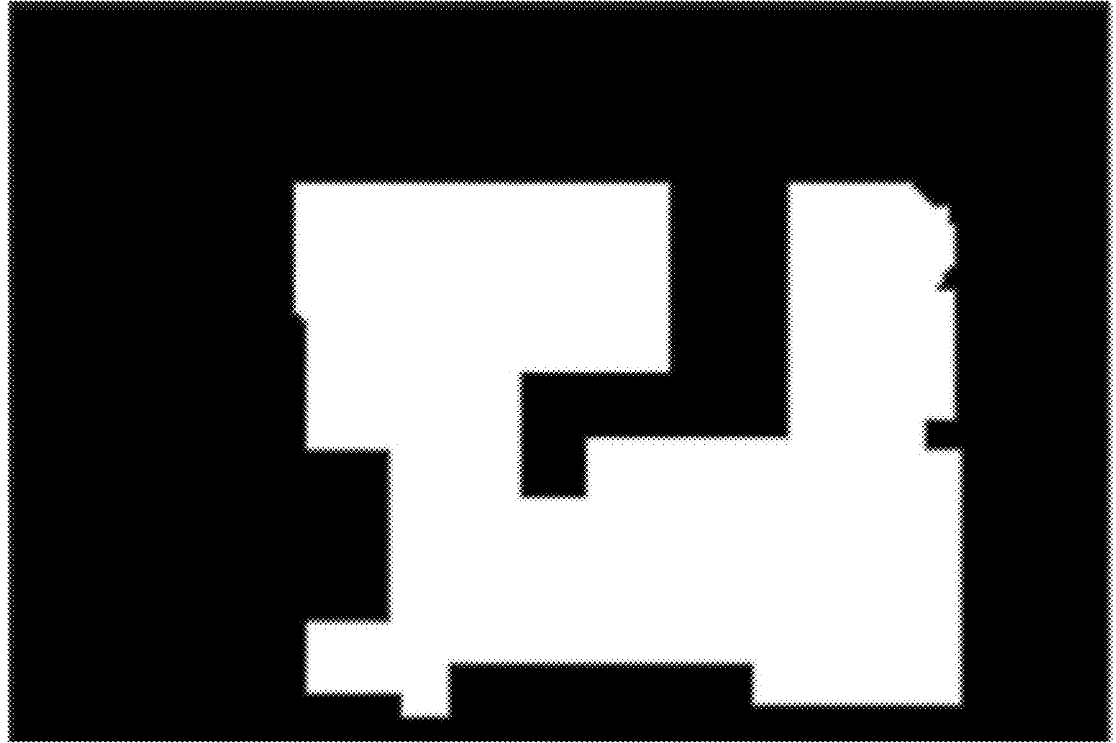
Figure 5P:
Figure 6:
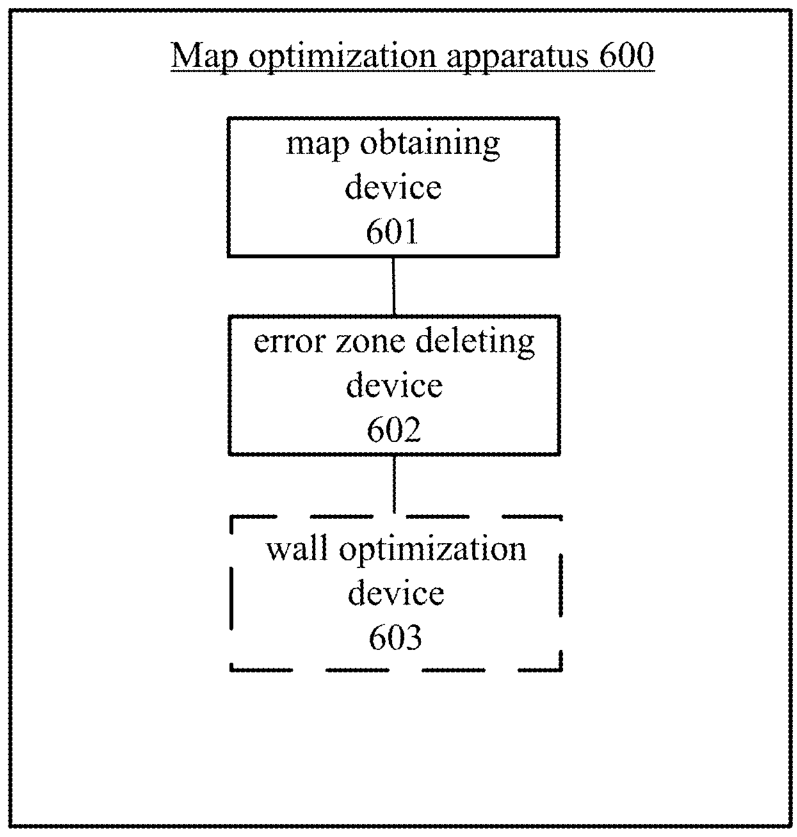
Figure 7:
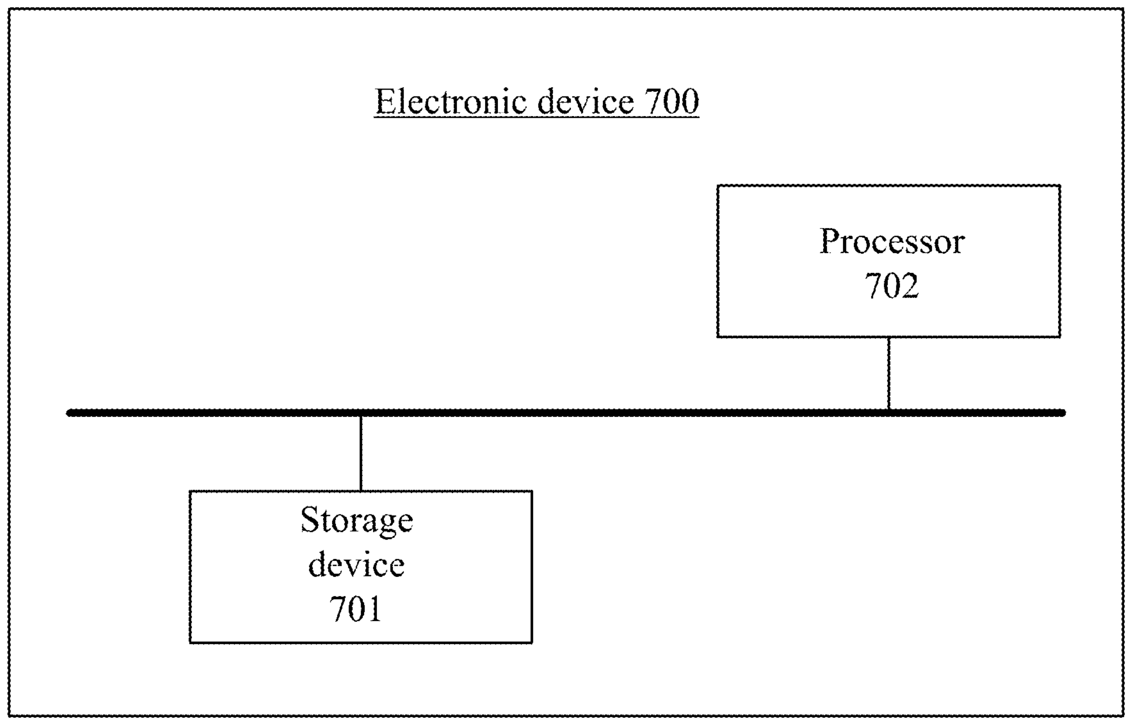
Figure 8:
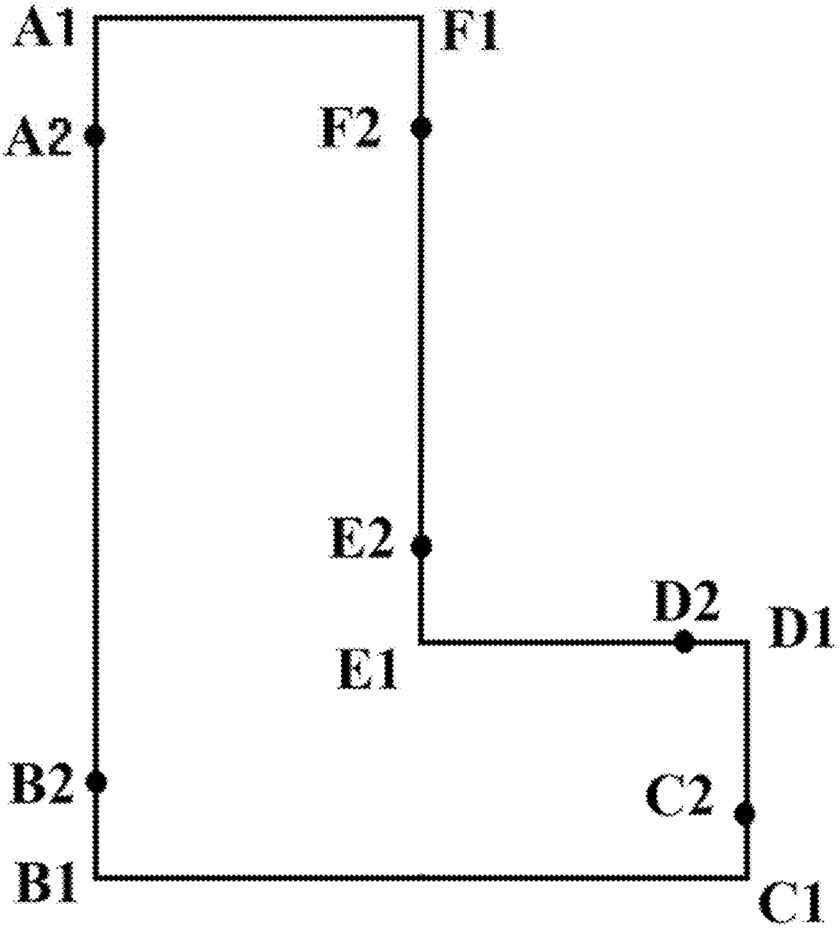
Figure 9:
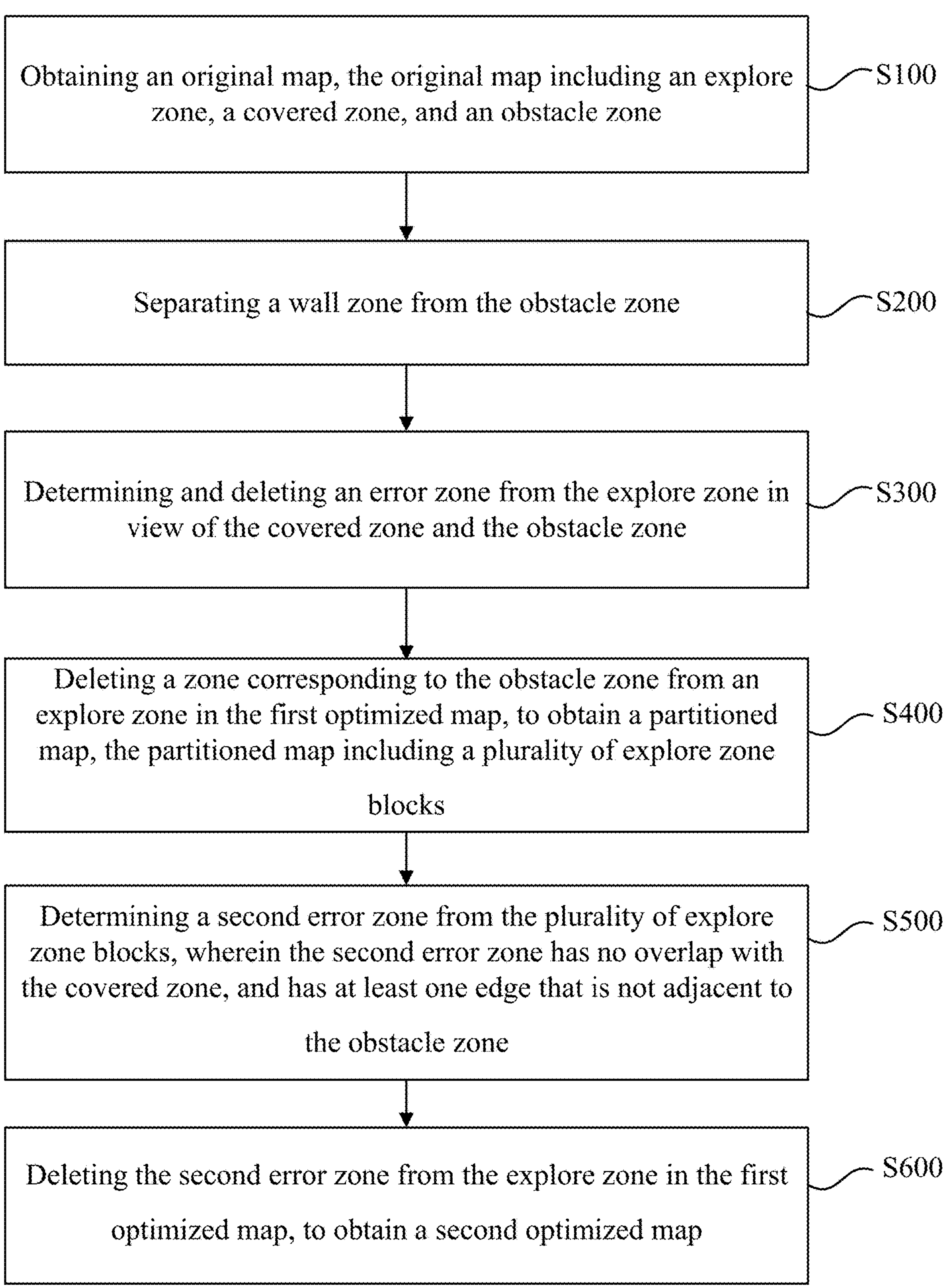
Figure 10:
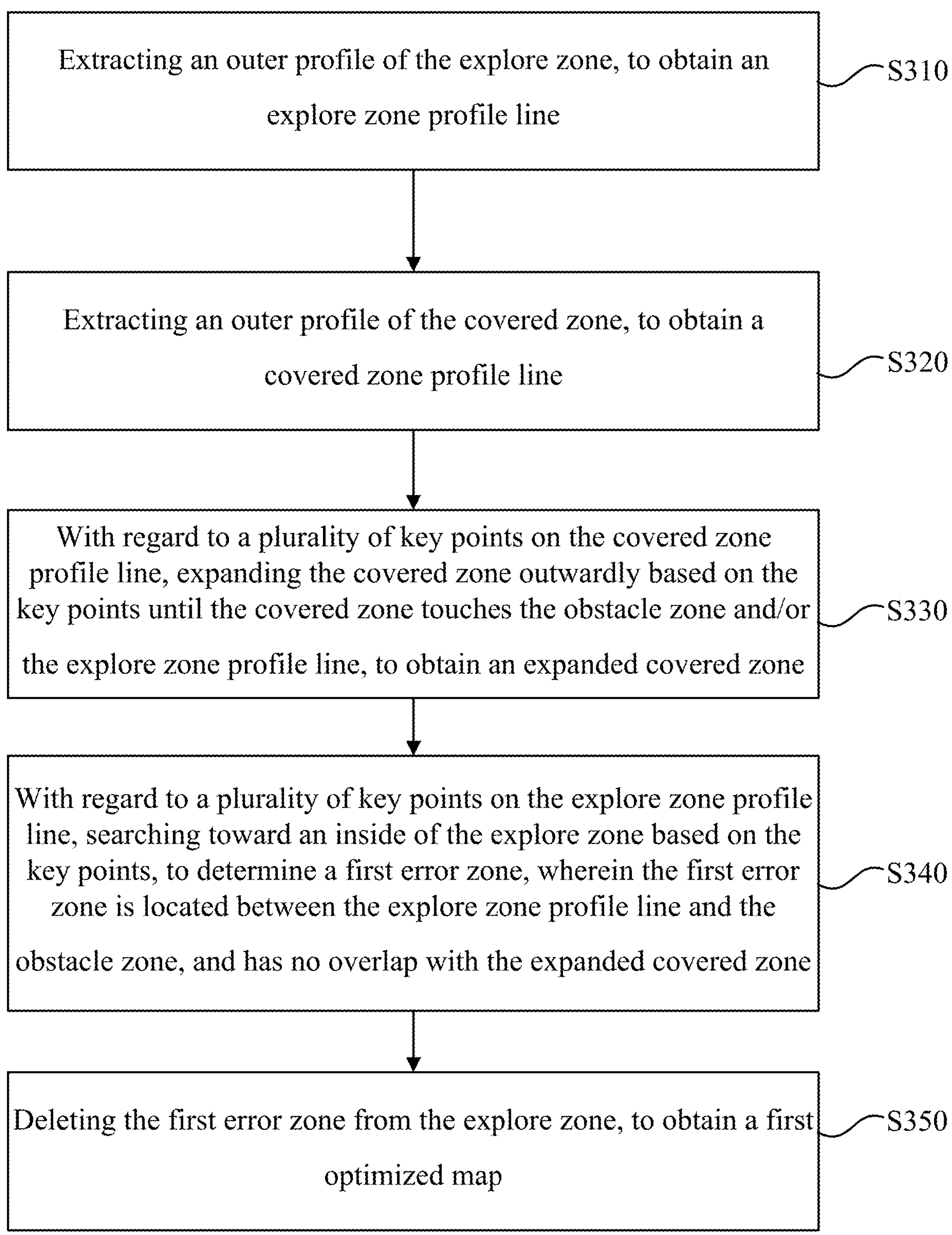

FIGS. 3A and 3B schematically illustrate expansion of a covered zone, according to an embodiment of the present disclosure;

FIGS. 4A and 4B schematically illustrate expansion of an explore zone in a third optimized map, according to an embodiment of the present disclosure;

FIGS. 5A-5P are schematic illustrations of actual processing steps according to an embodiment of the present disclosure;

FIG. 6 is a schematic illustration of a structure of a map optimization apparatus, according to an embodiment of the present disclosure;

FIG. 7 is a schematic illustration of a structure of an electronic device, according to an embodiment of the present disclosure;

FIG. 8 is a schematic illustration of a certain profile, according to an embodiment of the present disclosure;

FIG. 9 is a flowchart illustrating a method according to an embodiment of the present disclosure; and FIG. 10 is a flowchart illustrating a method according to an embodiment of the present disclosure.

DETAILED DESCRIPTIONS

In order for the objective, technical solutions, and advantages of the present disclosure to become clearer, next, with reference to the accompanying drawings of the embodiments of the present disclosure, the technical solutions of the embodiments of the present disclosure will be described clearly and comprehensively. The described embodiments are only some embodiments of the present disclosure, and are not all of the embodiments of the present disclosure. Based on the embodiments of the present disclosure, a person having ordinary skills in the art can obtain other embodiments without spending creative efforts. Such embodiments also fall into the protection scope of the present disclosure.

Typically, an autonomous mobile device is equipped with various types of sensors configured to explore an inner space of a work zone, and based on sensor data, the autonomous mobile device can create a work zone map or adjust a moving direction and route, etc.

In the process of creating the map, direct localization and indirect localization may be involved. Direct localization means that localization information of the autonomous mobile device is directly used as the points in the map. For example, using dead reckoning sensors (sometimes in combination with cameras or light detection and ranging (Lidar) sensors) such as an encoder wheel, a gyroscope, an accelerometer, etc., location coordinates (localization information) of the current location of the autonomous mobile device may be computed in real time through a Simultaneous Localization And Mapping (SLAM) algorithm. The location coordinates may correspond to corresponding points in the map. Alternatively, thought a collision sensor provided at the front portion of the autonomous mobile device, location coordinates when the autonomous mobile device touches an obstacle (objects in the work zone that block the movement of the autonomous mobile device, such as walls and ordinary obstacles, for example, furniture, etc.) may be detected. The location coordinates may correspond to corresponding points in the map. Indirect localization means points in the map may be indirectly calculated based on the localization information of the autonomous mobile device and the work principle of a light detection and ranging (Lidar) sensor. For example, after obtaining the location coordinates (localization information) of the autonomous mobile device, based on light detection and ranging (Lidar) sensors disposed at the top and/or sides of the autonomous mobile device (e.g., Lidar, Time of Flight (TOF) sensor, or infrared diodes, etc.), an obstacle that forms a certain relative angle and has a certain distance with respect to the autonomous mobile device may be detected in a contactless manner. As such, location coordinates of the detected obstacle may be indirectly calculated based on the location coordinates of the autonomous mobile device itself and the relative angle and distance of the detected obstacle with respect to the autonomous mobile device. The location coordinates of the detected obstacle may correspond to corresponding points in the map. For the space between the autonomous mobile device and the detected obstacle, because a detecting light of the light detection and ranging (Lidar) sensor passes through the space, the space also corresponds to corresponding points in the map. Certain errors may exist in these two localization methods, which may cause the ultimately created map to have some differences from the actual work zone, i.e., the created map may not be accurate. For example, surplus zones may exist in the created map, or the walls in the map may be irregular, etc. As such, when the created map is used as a basis for planning a moving route or for adjusting the moving direction, erroneous planning may occur, which may reduce the work efficiency of the autonomous mobile device.

Errors may exist in the original map obtained by the autonomous mobile device due to errors in the localization performed through an algorithm or due to factors of a localization device itself. In the present disclosure, due to localization errors caused by algorithm and errors caused by localization sensors, in the map obtained by the autonomous mobile device, there may be zones that do not match with the actual work zone. Such zones are referred to as error zones. Examples of the error zone may include an erroneous wall (e.g., a wall in the map that does not exist in the actual work zone), or a zone in the map in which the thicknesses of a wall that is different from a corresponding wall in the actual work zone, a zone in which a wall is curved, etc. The technical issues to be addressed by the present disclosure primarily include:

1) deleting zones that are erroneously created from the original map, while ensuring the integrity of the original information of the original map.

2) optimizing walls in the original map, such that the thicknesses of walls in the map are consistent, which are convenient for display.

3) straightening the walls in the map within a certain error range, which solves the issues relating to the walls in the map being not straight caused by the localization errors.

Existing technology typically extracts wall information from obstacles in the original map, and optimizes the walls through curve fitting or straight line detection. However, because the actual work zone environment is relatively complex, especially when the room has a relatively large number of obstacles, errors can easily occur in curve fitting, and it is also difficult to detect straight lines. In the meantime, localization of the autonomous mobile device may have errors, causing error zones to appear in the original map. Existing technology cannot recognize the error zones, and therefore, cannot delete these error zones.

As such, the present disclosure provides a map optimization method, an apparatus, an electronic device and a storage medium, to further optimize and adjust the created map, such that the optimized map is closer to the actual map, thereby avoiding map inaccuracy and low work efficiency caused by errors in the map.

Figure 1:
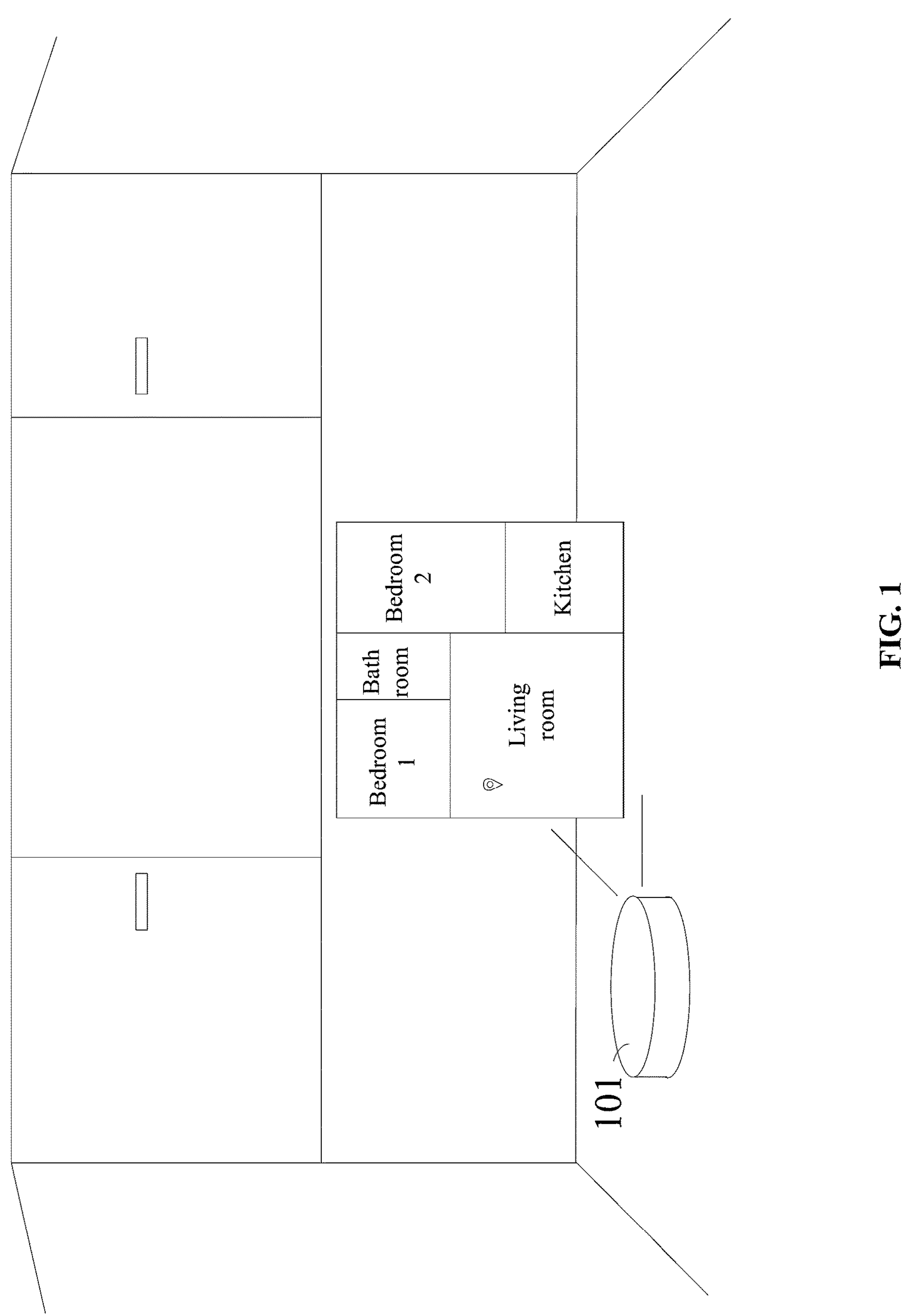
FIG. 1 is a schematic illustration of an application scene of the present disclosure.

FIG. 1 is a schematic illustration of an application scene of the present disclosure. As shown in FIG. 1, if the autonomous mobile device is a cleaning robot 101, it may be configured to perform indoor cleaning tasks. In initial operations, the cleaning robot 101 may traverse the indoor space (i.e., cleaning the indoor floor) to create an original map of a work zone. After creating the original map based on various sensor information, the method of the present disclosure may be used to optimize the original map, to obtain an optimized map. Subsequently, the optimized map may be used as a basis for the route planning, and subsequent cleaning tasks may be performed. The specific optimization process can refer to the following various embodiments.

Figure 2:
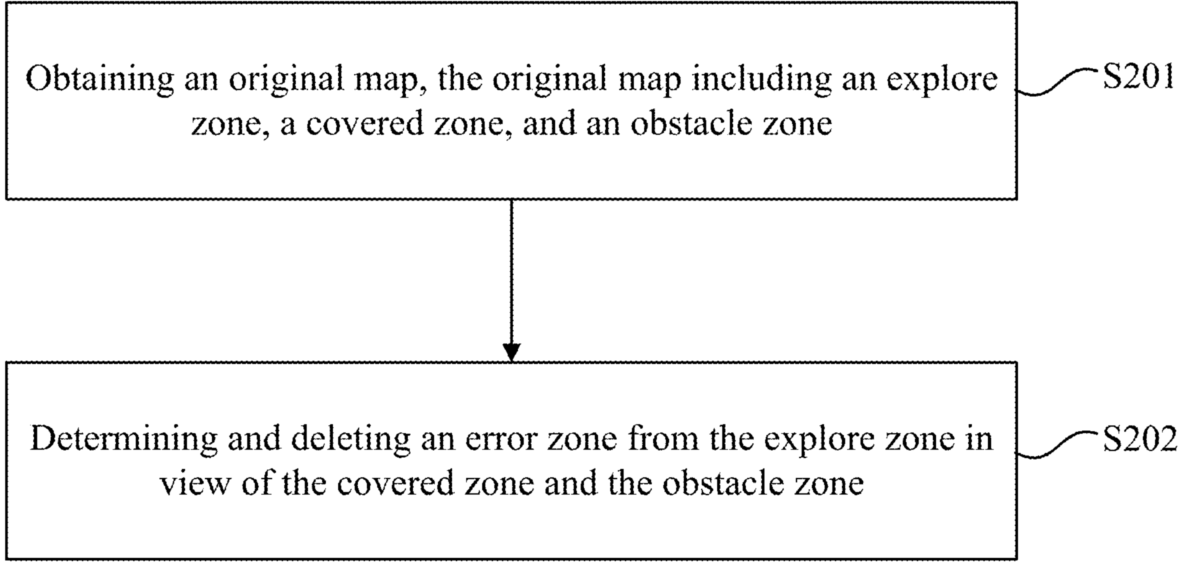
FIG. 2 is a flowchart illustrating a map optimization method, according to an embodiment of the present disclosure.

FIG. 2 is a flowchart illustrating a map optimization method, according to an embodiment of the present disclosure. As shown in FIG. 2, the method of this embodiment may include:

S201, obtaining an original map, the original map including an explore zone, a covered zone, and an obstacle zone (including a wall zone).

In some embodiments, the map optimization method may be executed after the autonomous mobile device has moved within the work zone and created the map of the work zone. Here, the obtained original map refers to a map created during the movement of the autonomous mobile.

Specifically, in the map creation process, initially, all locations may be set as unexplored zones. The autonomous mobile device moves in the work zone. Whenever the autonomous mobile device arrives at a location point, the autonomous mobile device re-determines properties of this location point. Alternatively, based on a trajectory traversed by the autonomous mobile device within a time period, properties of each location point on the trajectory may be re-determined.

In the map that is being created or that has been created, properties of each location point may be one or more of unexplored, already explored, already covered, obstacle present, etc. Here, an unexplored location point is a location point that has not been detected by the autonomous mobile device through direct localization or indirect localization. Correspondingly, an already explored location point is a location point that has been previously detected by the autonomous mobile device through direct localization or indirect localization, such as a location that the autonomous mobile device actually reached, and a space that the detecting light of the light detection and ranging (Lidar) sensor of the autonomous mobile device can pass through, and locations of obstacles that can reflect the detecting light. An already covered location point is a location point that has been detected through direct localization, which is also a location that the autonomous mobile device actually reached. From the above descriptions, it can be seen that an already covered location point may also be an already explored location point, but an already explored location point may not necessarily be an already covered location point. An obstacle present location point is a location point where an obstacle may be detected and recognized by the autonomous mobile device through direct localization or indirect localization, which typically includes a location point determined in view of signals obtained by components such as a collision sensor, a wheel drop sensor, etc. To implement the map optimization method of the present disclosure, it may be needed to separate location points corresponding to walls from location points of the obstacles. From the above-described definition of the obstacle present location points, it can be derived that location points of the walls are location points of walls that may be detected and recognized by the autonomous mobile device through direct localization or indirect localization. After the location points of the walls are separated from the obstacle present location points, the remaining location points are ordinary obstacle present location points. Actually, a wall is a type of a special obstacle. Wall present location points may be separated from the obstacle present location points based on information obtained from various sensors. For example, according to the above-described definitions of direct localization and indirect localization, it may be determined whether an obtained obstacle present location point is a wall present location point based on the information obtained through various sensors. Different values may be assigned to these two types of location points. For example, a wall present location point may be assigned with 100, and a location point where an obstacle of other types exist may be assigned with 85, thereby differentiating the two types of location points. In some embodiments, in the obtained original map or during the process of creating the original map, ordinary obstacle present location points and wall present location points may have already been separated and marked. In other embodiments, after obtaining the original map, wall present location points may be separated from obstacle present location points in the original map. The specific separating methods for separating the ordinary obstacle present location points and wall present location points are not issues to be addressed by the present disclosure, but are premises of the map optimization method of the present disclosure. Related separating methods may have various forms in the existing technology, some can refer to Chinese Patent Applications that are published as CN113064413A, CN111862133A.

As seen from the above descriptions, properties of each location point may be determined in view of various data generated in the map creation process.

The autonomous mobile device may create the map of the target zone while moving in the target zone. To differentiate between the unexplored location points, the already explored location points, the already covered location points, and the obstacle present location points (including wall present location points and ordinary obstacle present location points) in the map, these locations are displayed in the map using different pixel values. For example, the pixel value for an unexplored location point may be 75, the pixel value for an already explored location point may be 25, the pixel value for an already covered location point may be 0, the pixel value for an ordinary obstacle present location point may be 85, and the pixel value for a created wall present location point may be 100. The original map is shown in FIG. 5A.

Further, based on the property of each location point, all location points in the map may be divided into a plurality of zones, at least including an explore zone, a covered zone, and an obstacle zone (including a wall zone and/or an ordinary obstacle zone). Here, the explore zone may be a zone formed by all already explored location points, and the explore zone may represent the maximum range the autonomous mobile device can detect (including zones that can be determined through direct localization and indirect localization). The covered zone may be a zone formed by all already covered location points, and the covered zone may represent a zone that the autonomous mobile device can actually reach. The obstacle zone may be a zone formed by all obstacle present location points, and the obstacle zone may be a zone that the autonomous mobile device cannot pass through, regardless of whether the autonomous mobile device has attempted to pass through this zone. The obstacle zone may be specifically divided into a wall zone and an ordinary obstacle zone. The wall zone may be a zone formed by all wall present location points. FIG. 5B schematically depicts the explore zone, the covered zone, the ordinary obstacle zone, and the wall zone. It should be noted that because in the actual map, the shape and distribution of each zone are complex, FIG. 5B is only illustrative, and does not list all explore zones, covered zones, ordinary obstacle zones, and wall zones. In addition, some selection boxes include not just one type of zone, but a mixture or overlap of multiple types of zones. The displayed zone is only the main zone type or representative zone type in the selection box. Thus, FIG. 5B does not intend to impose limitations on the above various types of zones.

In other embodiments, in a work zone where the autonomous mobile device previously operated and created a map, the map optimization method may be executed separately. In this case, the obtained original map may be the already created map. The created map (or referred to as a historical map) may be previously created by the autonomous mobile device and stored in the autonomous mobile device or in a server. The created map may also be a historical map created by another autonomous mobile device when operating in the same work zone and stored in the server. For example, if a home has a floor sweeping robot and a floor mopping robot, because the robots both perform cleaning of the floors of the rooms of the same home, the work zones of the two devices are the same. The floor sweeping robot may store a map of the rooms of the home created during its operation in a server. Although the floor mopping robot may not have been operated in this work zone itself, it can obtain the historical map of the work zone of the rooms of the home directly from the server.

The name of each location point and the name of each zone used in the present disclosure may use other definitions. However, the sources of data referred to by the names are deterministic.

S202, determining and deleting an error zone from the explore zone in view of the covered zone and the obstacle zone (including at least the wall zone).

Based on the description of each property of a location point, it may be determined that overlap may occur between various zones. Here, the explore zone may have the largest area, which would likely have an overlap with the covered zone, the obstacle zone. A wall zone in the obstacle zone is a boundary of the work zone. The covered zone exists inside the work zone that is surrounded by the wall zone(s). Because the explore zone includes location points detected or calculated through indirect localization by sensors of the autonomous mobile device, this zone most likely has an error zone caused by environmental influence, sensor errors, and/or calculation inaccuracy. Actually, affected by the working principle of the sensors, a location point determined by a distance-measuring sensor such as a Lidar can easily be affected by the environment of the work zone. For example, if there is a mirror in a transmitting direction of a detecting light, the Lidar would likely be affected by the mirror reflection, the refraction of the detecting light, which can cause errors in the distance measurement, such errors in the distance measurement may result in error zones in the map. As such, the explore zone in the original map may be optimized.

It may be determined from the above analysis that the location points outside of the obstacle zone in the explore zone belong to the error zone. These location points may be deleted to achieve the optimization of the explore zone.

The map optimization method provided by the present disclosure may include: obtaining an original map, the original map including an explore zone, a covered zone, and an obstacle zone (including at least a wall zone); and determining and deleting an error zone from the explore zone in view of the covered zone and the obstacle zone. In the technical solution of the present disclosure, in view of the points in zones having different properties in the original map, and their localization principles, the error zone is determined and deleted from the original map, thereby accomplishing the optimization of the original map, such that it is closer to the actual map, which enables the autonomous mobile device to more efficiently execute tasks based on the optimized map.

To further optimize the map, a wall zone may be separated from the obstacle zone, and the wall zone may be optimized, to obtain an optimized map.

By optimizing the wall, the wall in the original map becomes closer to the actual situation, and the map is further improved.

In some embodiments, the above-described determining and deleting the error zone from the explore zone in view of the covered zone and the obstacle zone, may also include: extracting an outer profile of the explore zone as shown in FIG. 5C, to obtain an explore zone profile line as shown in FIG. 5D; extracting an outer profile of the covered zone (as shown in FIG. 5E), to obtain a covered zone profile line (the profile line formed at the border between the black and white portions as shown in FIG. 5E); with respect to a plurality of key points on the covered zone profile line, expanding the covered zone outwardly based on these key points until the covered zone touches the obstacle zone and/or the explore zone, to obtain an expanded covered zone, as shown in FIG. 5F; with respect to a plurality of key points on the explore zone profile line, searching toward an inside of the explore zone based on these key points, to determine a first error zone, wherein the first error zone is located between the explore zone profile line and the obstacle zone, and has no overlap with the expanded covered zone, as indicated in FIG. 5C; deleting the first error zone from the explore zone, to obtain a first optimized map, as shown in FIG. 5G. Here the key points refer to points that have a key function in forming the profile of a certain zone or those adjacent such points; a plurality of key points means that, to form the profile of the above-described certain zone, at least a plurality of key points are needed to form the profile of the certain zone. For example, for a triangular profile, the three vertex points/points adjacent to the vertex points of the triangular profile are key points, and a plurality of key points that can form the triangular profile include at least these three points; for a rectangular profile, the four vertex points/points adjacent to the vertex points of the rectangle are key points, and a plurality of key points that can form the rectangular profile include at least these four points; for the profile having the shape shown in FIG. 8, six vertex points A1, B1, C1, D1, E1, F1 or their adjacent points A2, B2, C2, D2, E2, F2 shown in FIG. 8 are key points, and a plurality of key points that can form this profile include at least six points: at least one point from A1 or A2, at least one point from B1 or B2, at least one point from C1 or C2, at least one point from D1 or D2, at least one point from E1 or E2, and at least one point from F1 or F2.

Specifically, one or more pixels may be used as the width standard for the profile line. For example, location points in the explore zone that are adjacent to the unexplored zone may be used to form the explore zone profile line (width is one pixel).

Further, the covered zone may be expanded. Similarly, location points in the covered zone that are adjacent to other zones may be extracted to form the covered zone profile line (width is one pixel), and the covered zone may be expanded outwardly at least based on a plurality of key points on the covered zone profile line. The condition for stopping the expansion may be touching the profile line of the obstacle zone and/or the explore zone.

In the present disclosure, expanding outwardly based on certain point means assigning one or more properties of this point to all location points on a segment that extends in a predetermine direction from this point as a starting point to a target point. This will be explained in detail with reference to the example shown in FIGS. 3A and 3B. As shown in FIG. 3A, each lattice represents a pixel, number "1" is used to indicate a location point in the covered zone (which may also be used to represent the property of "already covered"), number "2" is used to indicate a location point in the wall zone (which may also be used to represent the property of "wall present"). Points on the covered zone profile line may be expanded in a predetermined horizontal direction. A result of the expansion based on one of the points on the covered zone profile line is shown in FIG. 3B. The expansion shown here is only an example expansion method, which does not limit the specific expansion method to be used.

In some other scenes, the expansion of the covered zone based on the points on the covered zone profile line may be performed along a certain pre-set angle or multiple pre-set angles. The advantage of this type of expansion is, even when the wall zone is discontinuous and has break points, the expanded covered zone does not extend unlimitedly.

Points in the covered zone are locations actually reached by the autonomous mobile device, and may not necessarily represent all of the space outside of the obstacle zone in the work zone. As such, the expanded covered zone obtained through expansion are locations that actually can be reached by the autonomous mobile device determined based on the original map using an algorithm. Further, with respect to a plurality of key points on the explore zone profile line, searching toward an inside of the explore zone based on these key points may be performed. In the searching process, if the obstacle zone is first encountered, a zone between the explore zone profile line and the encountered obstacle zone may be determined as a first error zone; with respect to a plurality of key points on the explore zone profile line, searching toward an inside of the explore zone based on these key points may be performed. In the searching process, if the expanded covered zone is first encountered, a zone between the explore zone profile line and the encountered expanded covered zone does not belong to the expanded covered zone. The first error zone may be deleted from the explore zone, to obtain a first optimized map.

It should be noted that, the "first error zone" used herein is only for the purpose of indicating an error zone having such properties, in order to distinguish from error zones determined using other conditions, and this term should not limit the present disclosure.

In the process of expanding the covered zone, if the obstacle zone is discontinuous and has break points, the expanded covered zone may extend such that some error zones may overlap the expanded covered zone, which may not be deleted through the above steps. Therefore, the following steps may be further executed: deleting a zone corresponding to the obstacle zone from the explore zone in the first optimized map, to obtain a partitioned map, as shown in FIG. 5I; a zone corresponding to the obstacle zone in the first optimized map is an obstacle zone map, as shown in FIG. 5H; the partitioned map includes a plurality of explore zone blocks; a second error zone may be determined from the plurality of explore zone blocks; the second error zone may have no overlap with the covered zone, and may have at least one edge that is not adjacent to the obstacle zone, as shown in FIG. 5I. The second error zone may be deleted from the explore zone in the first optimized map, and the resulting explore zone may be superposed with the obstacle zone map, to obtain a second optimized map, as shown in FIG. 5J.

First, by deleting the zone corresponding to the obstacle zone, i.e., the obstacle zone map, as shown in FIG. 5H, the explore zone becomes a partitioned map, as shown in FIG. 5I. It can be understood that, if a block is correct, it would be located inside a work zone that is surrounded by the wall zone. That is, each edge of the block is adjacent to the obstacle zone. Therefore, a block having no overlap with the covered zone and having at least one edge that is not adjacent to the obstacle zone, is the second error zone. The second error zone may be deleted from the explore zone, to obtain the second optimized map, as shown in FIG. 5J.

In some embodiments, to make the partition between the blocks clearer, after the zone corresponding to the obstacle zone is deleted from the explore zone in the first optimized map, an etching operation may be performed. Correspondingly, after deleting the second error zone, a dilation operation may be performed.

After deleting the error zone, the wall may be further optimized. The optimization of the obstacle zone may specifically include: performing a dilation operation or a profile filling operation on locations corresponding to an ordinary obstacle zone in the second optimized map, to fill a cavity in the second optimized map, and performing a smooth operation on an edge of an explore zone in the second optimized map, to obtain a third optimized map, as shown in FIG. 5K; extracting an outer profile of an explore zone in the third optimized map, to obtain a new explore zone profile line, as shown in FIG. 5L; with regard to the new explore zone profile line, performing a straightening operation on an edge of the new explore zone profile line within a margin of error, to obtain a new outer wall zone profile line, as shown in FIG. 5M; with regard to a plurality of key points on the new outer wall zone profile line, searching toward an inside of the third optimized map based on these key points, to obtain a new wall zone profile line, as shown in FIG. 5N.

After deleting the zone corresponding to the obstacle zone, the locations corresponding to the wall zone and the ordinary obstacle zone are deleted. That is, one or more cavities are created inside the second optimized map at the ordinary obstacle zone. Gaps and holes in the explore zone of the second optimized map may be filled through a dilation operation, and a smooth operation may be performed on the edge of the filled explore zone, to accomplish the optimization of the explore zone. As described in the above embodiment, if the optimized explore zone is correct, it would be located inside the work zone that is surrounded by the wall zone, i.e., each edge would be adjacent to the wall zone. Thus, the new explore zone profile line may be approximately regarded as the new wall zone profile line. In the actual map, in ideal situations, the edge of the explore zone is consistent with the wall, and in reality, the wall is generally straight. The wall may include a smooth curve in rare situations. Therefore, by adjusting the explore zone profile line in the second optimized map, the adjusted explore zone profile line may be used as the new outer wall zone profile line. The outer wall zone profile line refers to a profile line of an outermost wall zone of the work zone. An inward search may be performed based on a plurality of key points on the outer wall zone profile line. After the location of the wall zone inside the work zone is found in the search, a straightening operation may be performed on wall zone, to obtain a new wall zone profile line, as shown in FIG. 5N.

The above-described optimization of the wall zone may also include: expanding, based on the new outer wall zone profile line, the explore zone of the third optimized map to the new outer wall zone profile line, to obtain an optimized explore zone, and to obtain the optimized map.

After adjusting the wall zone profile line, a gap may be created between the adjusted wall zone profile line and the explore zone of the third optimized map. Therefore, the explore zone of the third optimized map may be further expanded, to accomplish the optimization of the explore zone, thereby obtaining the optimized map of the explore zone, as shown in FIG. 5O. As such, the optimization of the explore zone and the wall zone are accomplished.

Specifically, the above described expanding, based on the new outer wall zone profile, the explore zone of the third optimized map to the new outer wall zone profile line to obtain the optimized explore zone, may include: with regard to a plurality of key points on the new outer wall zone profile line, searching toward an inside of the third optimized map in a predetermined direction based on these key points; labelling non-explore-zone points found in the search as new explore zone points, until points in the explore zone of the third optimized map are found, wherein the new explore zone points and the points in the explore zone of the third optimized map form an optimized explore zone.

Here, the predetermined direction may be a direction perpendicular to the new outer wall zone profile line, a direction forming a predetermined angle with the new outer wall zone profile line, etc.

The inward searching process may be similar to the outward expansion shown in FIGS. 3A and 3B, and FIGS. 4A and 4B are used to further explain this process. As shown in FIG. 4A, each lattice represents a pixel, number "3" is used to indicate a location point in the explore zone of the third optimized map (which may also be used to represent the "already explored" property), number "4" is used to indicate a location point on the new outer wall zone profile line (which may also be used to represent the "wall present" property). The inward search may be performed in a predetermined horizontal direction based on points on the new outer wall zone profile line. A result of the expansion based on a point on the new outer wall zone profile line is shown in FIG. 4B. The newly labelled point is still labelled by number "3," and the "new" description is only used to distinguish the steps. Here only one expansion method is shown for illustrative purposes. The specific expansion method is not limited in the present disclosure.

In the optimized explore zone map shown in FIG. 50, superposing the covered zone shown in FIG. 5E and the new wall zone profile line shown in FIG. 5N, the ultimate optimized map shown in FIG. 5P may be obtained.

FIG. 6 is a schematic illustration of a structure of a map optimization apparatus according to an embodiment of the present disclosure. As shown in FIG. 6, a map optimization apparatus 600 of this embodiment may include: an original map obtaining device 601, an error zone deleting device 602. In some embodiments, the map optimization apparatus 600 may include both hardware and software. For example, at least one of the devices shown in FIG. 6, which is included in the map optimization apparatus 600, may include a memory and/or a processor.

The original map obtaining device 601 may be configured to obtain an original map, the original map including an explore zone, a covered zone, and an obstacle zone.

The error zone deleting device 602 may be configured to determine and delete an error zone from the explore zone in view of the covered zone and the obstacle zone.

In some embodiments, the apparatus 600 may also include:

- a wall optimization device 603 configured to separate a wall zone from the obstacle zone, and to optimize the wall zone to obtain an optimized map.

In some embodiments, the error zone deleting device 602 may be specifically configured to:

- extract an outer profile of the explore zone, to obtain an explore zone profile line;
- extract an outer profile of the covered zone, to obtain a covered zone profile line;
- with regard to a plurality of key points on the covered zone profile line, expand the covered zone outwardly based on these key points until the covered zone touches the explore zone profile line, to obtain an expanded covered zone;
- with regard to a plurality of key points on the explore zone profile line, search toward an inside of the explore zone based on the key points, to determine a first error zone, wherein the first error zone is located between the explore zone profile line and the obstacle zone, and has no overlap with the expanded covered zone;
- delete the first error zone from the explore zone, to obtain a first optimized map.

In some embodiments, the error zone deleting device 602 may also be configured to:

- delete a zone corresponding to the obstacle zone from the explore zone in the first optimized map to obtain a partitioned map; the partitioned map including a plurality of explore zone blocks;
- determine a second error zone from a plurality of explore zone blocks, the second error zone having no overlap with the covered zone, and having at least one edge that is not adjacent to the obstacle zone;
- delete the second error zone from the explore zone in the first optimized map, to obtain a second optimized map.

In some embodiments, the obstacle zone may also include an ordinary obstacle zone;

The wall optimization device 603 may be specifically configured to:

perform a dilation operation or a profile filling operation on locations corresponding to an ordinary obstacle zone in the second optimized map, to fill a cavity in the second optimized map, and perform a smooth operation on an edge of an explore zone in the second optimized map, to obtain a third optimized map;

extract an outer profile of the explore zone in the third optimized map, to obtain a new explore zone profile line;

with regard to the new explore zone profile line, perform a straightening operation on an edge of the new explore zone profile line within a margin of error, to obtain a new outer wall zone profile line;

with regard to a plurality of key points on the new outer wall zone profile line, search toward an inside of the third optimized map based on the key points, to obtain a new outer wall zone profile line.

In some embodiments, the wall optimization device 603 may also be configured to:

expand, based on the new outer wall zone profile line, the explore zone in the third optimized map to the new outer wall zone profile line, to obtain an optimized explore zone, and to obtain an optimized map.

In some embodiments, when the wall optimization device 603 expands, based on the new outer wall zone profile line, the explore zone in the third optimized map to the new outer wall zone profile line, to obtain the optimized explore zone, it may be specifically configured to:

with regard to a plurality of key points on the new outer wall zone profile line, search in a predetermined direction toward an inside of the third optimized map based on the key points, and label non-explore zone points found in the search as new explore zone points, until points in the explore zone of the third optimized map are found, wherein the new explore zone points and the points in the explore zone of the third optimized map form an optimized explore zone.

The apparatus provided by this embodiment may be configured to execute the method of any of the above embodiments, the realization principle and technical effects are similar, which are not repeated.

FIG. 7 is a schematic illustration of a structure of an electronic device, according to an embodiment of the present disclosure. As shown in FIG. 7, an electronic device 700 of this embodiment may include: a storage device 701, a processor 702.

The storage device 701 may be configured to store program instructions. The storage device 701 may be any suitable non-transitory computer-readable storage medium, such as a read-only memory (ROM), a random access memory (RAM), a flash memory, a hard disk, a solid state drive, an optic disk, etc.

The processor 702 may be configured to retrieve and execute the program instructions from the storage device 701, to execute the method of any of the above embodiments, the realization principle and technical effects are similar, which are not repeated. The processor 702 may include both hardware and software. The processor 702 may be any suitable processor, such as a central processing unit (CPU), a graphic processing unit (GPU), a microprocessor, etc.

The electronic device of this embodiment may be an autonomous mobile device, or a management system of an autonomous mobile device.

The present disclosure also provides a non-transitory computer-readable storage medium, the storage medium stores a computer program. When the computer program is executed by the processor, the method of any of the above embodiments may be executed.

The present disclosure also provides a computer program product, including a computer program. When the computer program is executed by the processor, the method of any of the above embodiments may be realized.

A person having ordinary skills in the art can appreciate: all or some steps of the method embodiments can be implemented through hardware related to computer instructions. The above-described program may be stored in a computer-readable storage medium. When the program is executed, the steps of the method of the above various embodiments can be executed. The above-described storage medium may include: various media that can store program codes, such as ROM, RAM, magnetic disks or optic disks.

FIG. 9 is a flowchart illustrating a method according to an embodiment of the present disclosure. The method may include the following steps:

S100: obtaining an original map, the original map including an explore zone, a covered zone, and an obstacle zone.

S200: separating a wall zone from the obstacle zone.

S300: determining and deleting an error zone from the explore zone in view of the covered zone and the obstacle zone.

S400: deleing a zone corresponding to the obstacle zone from an explore zone in the first optimized map, to obtain a partitioned map, the partitioned map including a plurality of explore zone blocks.

S500: determining a second error zone from the plurality of explore zone blocks, wherein the second error zone has no overlap with the covered zone, and has at least one edge that is not adjacent to the obstacle zone.

S600: deleting the second error zone from the explore zone in the first optimized map, to obtain a second optimized map.

FIG. 10 is a flowchart illustrating a method according to an embodiment of the present disclosure. The steps shown in FIG. 10 may be detailed steps of S300 shown in FIG. 9. The method may include the following steps:

S310: extracting an outer profile of the explore zone, to obtain an explore zone profile line.

S320: extracting an outer profile of the covered zone, to obtain a covered zone profile line.

S330: with regard to a plurality of key points on the covered zone profile line, expanding the covered zone outwardly based on the key points until the covered zone touches the obstacle zone and/or the explore zone profile line, to obtain an expanded covered zone.

S340: with regard to a plurality of key points on the explore zone profile line, searching toward an inside of the explore zone based on the key points, to determine a first error zone, wherein the first error zone is located between the explore zone profile line and the obstacle zone, and has no overlap with the expanded covered zone.

S350: deleting the first error zone from the explore zone, to obtain a first optimized map.

It is noted that an embodiment of the disclosed method may or may not include all of the steps shown in the flowcharts. The steps shown in the flowcharts merely reflect one embodiment. In other embodiments, a method may include additional steps, or some steps shown in the flowcharts may be omitted, or may have different sequences. In some embodiments, the method may include any suitable combination of the steps shown in both FIG. 9 and FIG. 10.

Finally, it should be noted that: the above embodiments are only used to explain the technical solutions of the present disclosure, and are not to limit the present disclosure; although detailed explanations have been provided for the present disclosure with reference to the above various embodiments, a person having ordinary skills in the art should understand: the person having ordinary skills in the art can modify the technical solutions described in the above various embodiments, or carry out equivalent replacement to some or all technical features. These modifications or replacements do not render relevant technical solutions to deviate from the scope of the technical solutions of various embodiments of the present disclosure.

What is claimed is:

1. A map optimization method, comprising:

generating, by an autonomous mobile device, an original map of a work zone while the autonomous mobile device moves in the work zone, the original map including an explore zone, a covered zone, an obstacle zone;

separating, by a processor, a wall zone from the obstacle zone, wherein the processor is a processor of the autonomous mobile device or a processor of a management system of the autonomous mobile device; and determining and deleting, by the processor, an error zone from the explore zone in view of the covered zone and the obstacle zone, wherein determining and deleting, by the processor, the error zone from the explore zone in view of the covered zone and the obstacle zone, includes:

extracting, by the processor, an outer profile of the explore zone, to obtain an explore zone profile line;

extracting, by the processor, an outer profile of the covered zone, to obtain a covered zone profile line;

with regard to a plurality of key points on the covered zone profile line, expanding, by the processor, the covered zone outwardly based on the plurality of key points on the covered zone profile line until the covered zone touches the obstacle zone and/or the explore zone profile line, to obtain an expanded covered zone;

with regard to a plurality of key points on the explore zone profile line, searching, by the processor, toward an inside of the explore zone based on the plurality of key points on the explore zone profile line, to determine a first error zone, wherein the first error zone is located between the explore zone profile line and the obstacle zone, and has no overlap with the expanded covered zone; and deleting, by the processor, the first error zone from the explore zone, to obtain a first optimized map, wherein the method further includes:

deleting, by the processor, a zone corresponding to the obstacle zone from an explore zone in the first optimized map, to obtain a partitioned map, the partitioned map including a plurality of explore zone blocks;

determining, by the processor, a second error zone from the plurality of explore zone blocks, wherein the second error zone has no overlap with the covered zone, and has at least one edge that is not adjacent to the obstacle zone; and deleting, by the processor, the second error zone from the explore zone in the first optimized map, to obtain a second optimized map, wherein the obstacle zone includes an ordinary obstacle zone, wherein the method further includes optimizing, by the processor, the wall zone after the wall zone is separated from the obstacle zone, and wherein optimizing, by the processor, the wall zone includes:

performing, by the processor, a dilation operation or a profile filling operation on a location corresponding to the ordinary obstacle zone in the second optimized map, to fill a cavity in the second optimized map, and performing, by the processor, a smooth operation on an edge of an explore zone in the second optimized map, to obtain a third optimized map;

extracting, by the processor, an outer profile of an explore zone in the third optimized map, to obtain a new explore zone profile line;

with regard to the new explore zone profile line, performing, by the processor, a straightening operation on an edge of the new explore zone profile line within a margin of error, to obtain a new outer wall zone profile line; and with regard to a plurality of key points on the new outer wall zone profile line, searching, by the processor, toward an inside of the third optimized map based on the plurality of key points on the new outer wall zone profile line, to obtain a new wall zone profile line.

2. The method according to claim 1, wherein, optimizing, by the processor, the wall zone also includes:

expanding, by the processor, based on the new outer wall zone profile line, the explore zone in the third optimized map to the new outer wall zone profile line, to obtain an optimized explore zone.

3. The method according to claim 2, wherein, expanding, by the processor, based on the new outer wall zone profile line, the explore zone in the third optimized map to the new outer wall zone profile line, to obtain the optimized explore zone, includes:

with regard to the plurality of key points on the new outer wall zone profile line, searching, by the processor, in a predetermined direction toward the inside of the third optimized map based on the plurality of key points on the new outer wall zone profile line, and labelling, by the processor, non-explore zone points found in the search as new explore zone points, until points in the explore zone of the third optimized map are found, wherein the new explore zone points and the points in the explore zone of the third optimized map form the optimized explore zone.

4. An electronic device, comprising:

a storage device configured to store program instructions; and a processor configured to retrieve and execute the program instructions from the storage device, to execute a map optimization method, wherein when executing the map optimization method, the processor is configured to:

obtain an original map of a work zone generated by an autonomous mobile device while the autonomous mobile device moves in the work zone, the original map including an explore zone, a covered zone, an obstacle zone;

separate a wall zone from the obstacle zone; and determine and delete an error zone from the explore zone in view of the covered zone and the obstacle zone, wherein when the processor is configured to determine and delete the error zone from the explore zone in view of the covered zone and the obstacle zone, the processor is also configured to:

extract an outer profile of the explore zone, to obtain an explore zone profile line;

extract an outer profile of the covered zone, to obtain a covered zone profile line;

with regard to a plurality of key points on the covered zone profile line, expand the covered zone outwardly based on the plurality of key points on the covered zone profile line until the covered zone touches the obstacle zone and/or the explore zone profile line, to obtain an expanded covered zone;

with regard to a plurality of key points on the explore zone profile line, search toward an inside of the explore zone based on the plurality of key points on the explore zone profile line, to determine a first error zone, wherein the first error zone is located between the explore zone profile line and the obstacle zone, and has no overlap with the expanded covered zone; and delete the first error zone from the explore zone, to obtain a first optimized map, wherein when executing the map optimization method, the processor is also configured to:

delete a zone corresponding to the obstacle zone from an explore zone in the first optimized map, to obtain a partitioned map, the partitioned map including a plurality of explore zone blocks;

determine a second error zone from the plurality of explore zone blocks, wherein the second error zone has no overlap with the covered zone, and has at least one edge that is not adjacent to the obstacle zone; and delete the second error zone from the explore zone in the first optimized map, to obtain a second optimized map, wherein the obstacle zone includes an ordinary obstacle zone;

wherein the processor is configured to optimize the wall zone after the wall zone is separated from the obstacle zone, and wherein when the processor optimizes the wall zone, the processor is also configured to:

perform a dilation operation or a profile filling operation on a location corresponding to the ordinary obstacle zone in the second optimized map, to fill a cavity in the second optimized map, and perform a smooth operation on an edge of an explore zone in the second optimized map, to obtain a third optimized map;

extract an outer profile of an explore zone in the third optimized map, to obtain a new explore zone profile line;

with regard to the new explore zone profile line, perform a straightening operation on an edge of the new explore zone profile line within a margin of error, to obtain a new outer wall zone profile line; and with regard to a plurality of key points on the new outer wall zone profile line, search toward an inside of the third optimized map based on the plurality of key points on the new outer wall zone profile line, to obtain a new wall zone profile line.

5. The electronic device according to claim 4, wherein when the processor is configured to optimize the wall zone, the processor is also configured to:

expand, based on the new outer wall zone profile line, the explore zone in the third optimized map to the new outer wall zone profile line, to obtain an optimized explore zone.

6. The electronic device according to claim 5, wherein when the processor is configured to expand, based on the new outer wall zone profile line, the explore zone in the third optimized map to the new outer wall zone profile line, to obtain the optimized explore zone, the processor is also configured to:

with regard to the plurality of key points on the new outer wall zone profile line, search in a predetermined direction toward the inside of the third optimized map based on the plurality of key points on the new outer wall zone profile line, and label non-explore zone points found in the search as new explore zone points, until points in the explore zone of the third optimized map are found, wherein the new explore zone points and the points in the explore zone of the third optimized map form the optimized explore zone.

7. A non-transitory computer-readable storage medium storing a computer program including instructions, which when executed by a processor, cause the processor to perform a map optimization method comprising:

obtaining an original map of a work zone generated by an autonomous mobile device while the autonomous mobile device moves in the work zone, the original map including an explore zone, a covered zone, an obstacle zone;

separating a wall zone from the obstacle zone; and determining and deleting an error zone from the explore zone in view of the covered zone and the obstacle zone, wherein determining and deleting the error zone from the explore zone in view of the covered zone and the obstacle zone, includes:

extracting an outer profile of the explore zone, to obtain an explore zone profile line;

extracting an outer profile of the covered zone, to obtain a covered zone profile line;

with regard to a plurality of key points on the covered zone profile line, expanding the covered zone outwardly based on the plurality of key points on the covered zone profile line until the covered zone touches the obstacle zone and/or the explore zone profile line, to obtain an expanded covered zone;

with regard to a plurality of key points on the explore zone profile line, searching toward an inside of the explore zone based on the plurality of key points on the explore zone profile line, to determine a first error zone, wherein the first error zone is located between the explore zone profile line and the obstacle zone, and has no overlap with the expanded covered zone; and deleting the first error zone from the explore zone, to obtain a first optimized map, wherein the method further comprises:

deleting a zone corresponding to the obstacle zone from an explore zone in the first optimized map, to obtain a partitioned map, the partitioned map including a plurality of explore zone blocks;

determining a second error zone from the plurality of explore zone blocks, wherein the second error zone has no overlap with the covered zone, and has at least one edge that is not adjacent to the obstacle zone; and deleting the second error zone from the explore zone in the first optimized map, to obtain a second optimized map, wherein, the obstacle zone includes an ordinary obstacle zone;

wherein the method further includes optimizing the wall zone after the wall zone is separated from the obstacle zone, and wherein optimizing the wall zone includes:

performing a dilation operation or a profile filling operation on a location corresponding to the ordinary obstacle zone in the second optimized map, to fill a cavity in the second optimized map, and performing a smooth operation on an edge of an explore zone in the second optimized map, to obtain a third optimized map;

extracting an outer profile of an explore zone in the third optimized map, to obtain a new explore zone profile line;

with regard to the new explore zone profile line, performing a straightening operation on an edge of the new explore zone profile line within a margin of error, to obtain a new outer wall zone profile line; and with regard to a plurality of key points on the new outer wall zone profile line, searching toward an inside of the third optimized map based on the plurality of key points on the new outer wall zone profile line, to obtain a new wall zone profile line.

8. The non-transitory computer-readable storage medium according to claim 7, wherein, optimizing the wall zone also includes:

expanding, based on the new outer wall zone profile line, the explore zone in the third optimized map to the new outer wall zone profile line, to obtain an optimized explore zone;

wherein, expanding, based on the new outer wall zone profile line, the explore zone in the third optimized map to the new outer wall zone profile line, to obtain the optimized explore zone, includes:

with regard to the plurality of key points on the new outer wall zone profile line, searching in a predetermined direction toward the inside of the third optimized map based on the plurality of key points on the new outer wall zone profile line, and labelling non-explore zone points found in the search as new explore zone points, until points in the explore zone of the third optimized map are found, wherein the new explore zone points and the points in the explore zone of the third optimized map form the optimized explore zone.

* * * * *